United States Patent
Fujiwara

(10) Patent No.: US 11,833,626 B2
(45) Date of Patent: Dec. 5, 2023

(54) WELDING TIP

(71) Applicant: Panasonic Intellectual Property Management Co., Ltd., Osaka (JP)

(72) Inventor: Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 698 days.

(21) Appl. No.: 16/984,395

(22) Filed: Aug. 4, 2020

(65) Prior Publication Data
US 2020/0376586 A1    Dec. 3, 2020

Related U.S. Application Data

(63) Continuation of application No. PCT/JP2018/043418, filed on Nov. 26, 2018.

(30) Foreign Application Priority Data
Feb. 5, 2018   (JP) ................. 2018-018380

(51) Int. Cl.
  *B23K 9/26*   (2006.01)
  *B23K 9/12*   (2006.01)

(52) U.S. Cl.
  CPC ............. *B23K 9/26* (2013.01); *B23K 9/123* (2013.01)

(58) Field of Classification Search
  CPC .......... B23K 9/26; B23K 9/122; B23K 9/123; B23K 9/287
  See application file for complete search history.

(56) References Cited

U.S. PATENT DOCUMENTS 1,959,194 A * 5/1934 Chapman .............. B23K 9/123
                                                   219/136
2,366,068 A * 12/1944 Sohn ..................... B23K 9/123
                                                   191/1 R
(Continued)

FOREIGN PATENT DOCUMENTS

DE          3340191       5/1985
JP          40-32441      11/1965
(Continued)

OTHER PUBLICATIONS

Examination Report dated Jun. 2, 2022 in corresponding Indian Patent Application No. 202047037133.
(Continued)

*Primary Examiner* — Brian W Jennison
(74) *Attorney, Agent, or Firm* — Wenderoth, Lind & Ponack, L.L.P.

(57) ABSTRACT

A welding tip includes a tip body having a wire insertion bore along a central axis and a leaf spring configured to press a welding wire onto a feeding point disposed on an inner surface of the wire insertion bore. The tip body 1a has an aperture on an outer circumferential surface on the distal end side. The leaf spring has a first end that is a free end disposed on the distal end side of the tip body and a second end fixed to the tip body. The aperture includes a first aperture accommodating the leaf spring and second apertures disposed in communication with the first aperture and configured to discharge wear particles created during welding to the outside.

9 Claims, 20 Drawing Sheets

(56) References Cited

U.S. PATENT DOCUMENTS

| | | | | |
|---|---|---|---|---|
| 3,142,746 | A | * | 7/1964 | Schmerling .......... B23K 9/123 219/137.61 |
| 3,688,079 | A | * | 8/1972 | Jabsen ................. B23K 9/122 219/127 |
| 4,482,797 | A | * | 11/1984 | Shiramizu .............. B23K 9/28 219/137.61 |
| 4,988,846 | A | | 1/1991 | Karlsten et al. |
| 5,635,091 | A | * | 6/1997 | Hori ..................... B23K 9/123 219/136 |
| 6,710,300 | B2 | * | 3/2004 | Steenis ................ B23K 9/123 219/137.61 |
| 8,450,646 | B2 | * | 5/2013 | Ma ....................... B23K 9/123 219/137.43 |
| 8,487,217 | B2 | * | 7/2013 | Matthews ............. B23K 9/287 219/137.52 |
| 2005/0016977 | A1 | * | 1/2005 | Taaler .................. B23K 9/173 219/137.61 |
| 2006/0151453 | A1 | * | 7/2006 | Gordon ................ B23K 9/123 219/137.61 |
| 2014/0097167 | A1 | * | 4/2014 | Davis ................... B23K 9/123 219/137.44 |

FOREIGN PATENT DOCUMENTS

| | | |
|---|---|---|
| JP | 56-142880 | 10/1981 |
| JP | 62-118680 | 7/1987 |
| JP | 64-18582 | 1/1989 |
| JP | 01-50510 | 10/1989 |
| JP | 02-123376 | 10/1990 |
| JP | 04-344873 | 12/1992 |
| JP | 10-034341 | 2/1998 |
| JP | 11-033730 | 2/1999 |
| JP | 2003-275872 | 9/2003 |

OTHER PUBLICATIONS

Extended European Search Report dated Mar. 22, 2021 in corresponding European Patent Application No. 18903445.7.
Machine-translated English specification of JP 4-344873.
Machine-translated English specification of JP 11-033730.
International Search Report dated Feb. 19, 2019 in International (PCT) Application No. PCT/JP2018/043418.

* cited by examiner

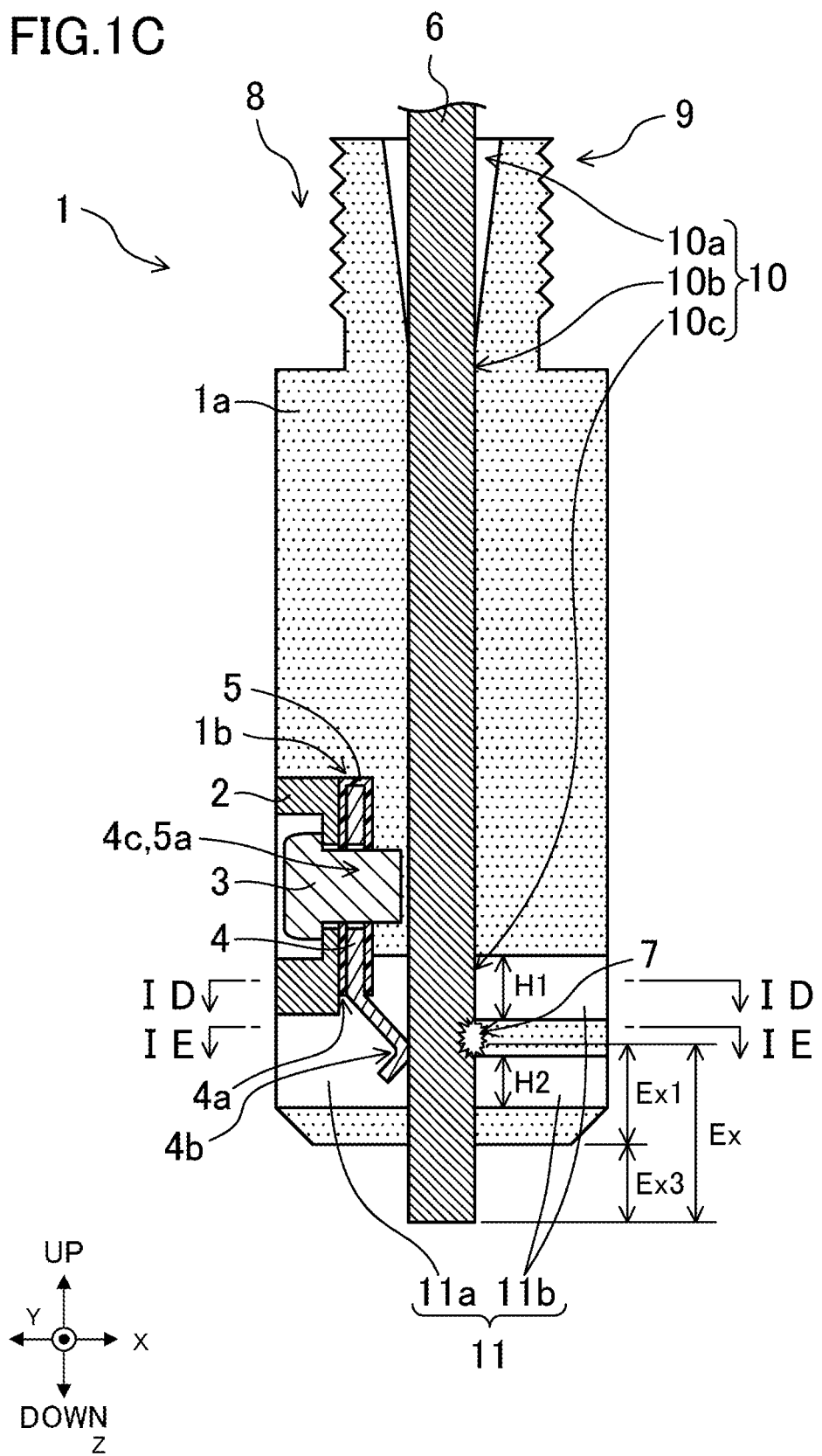

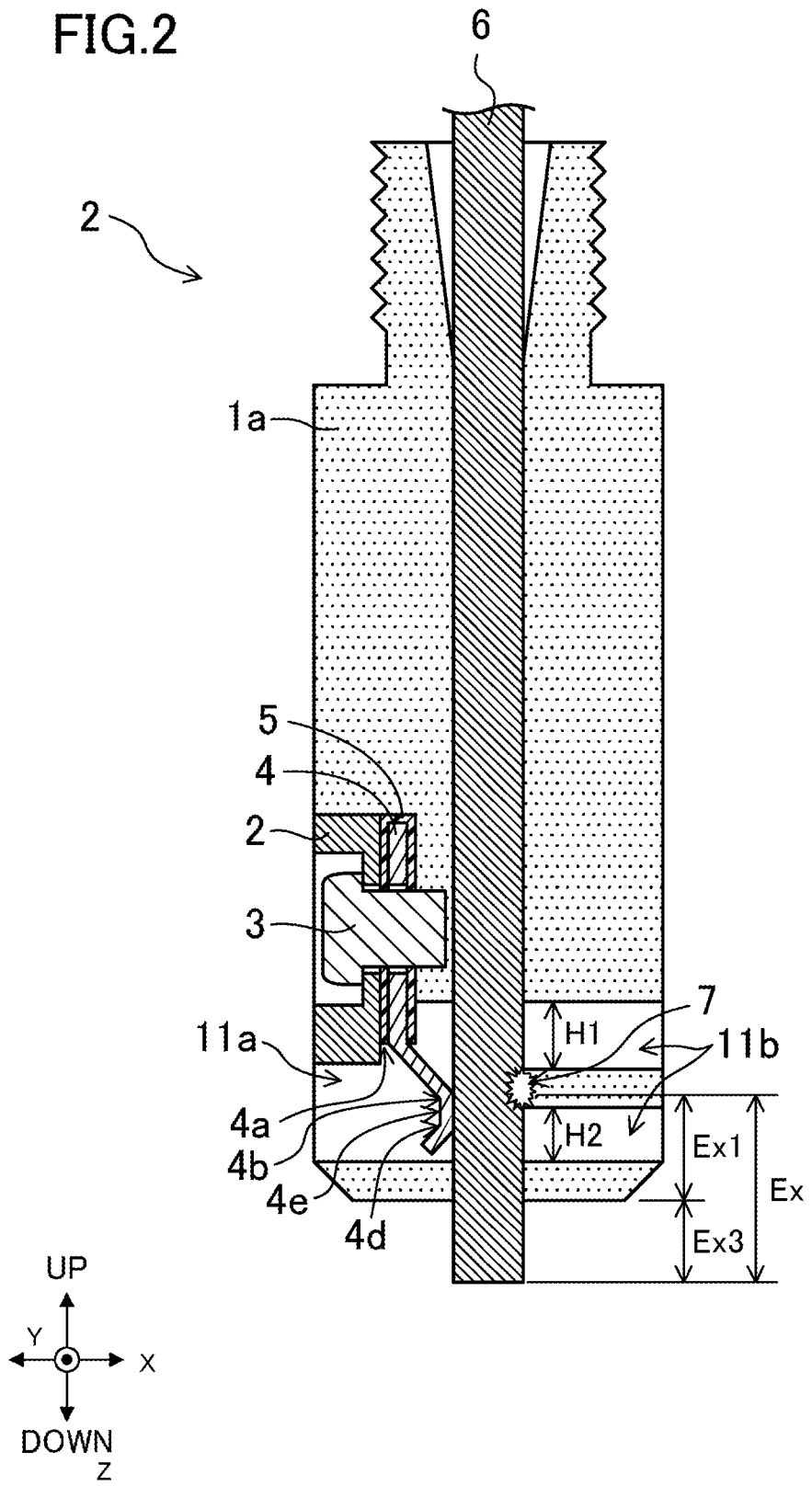

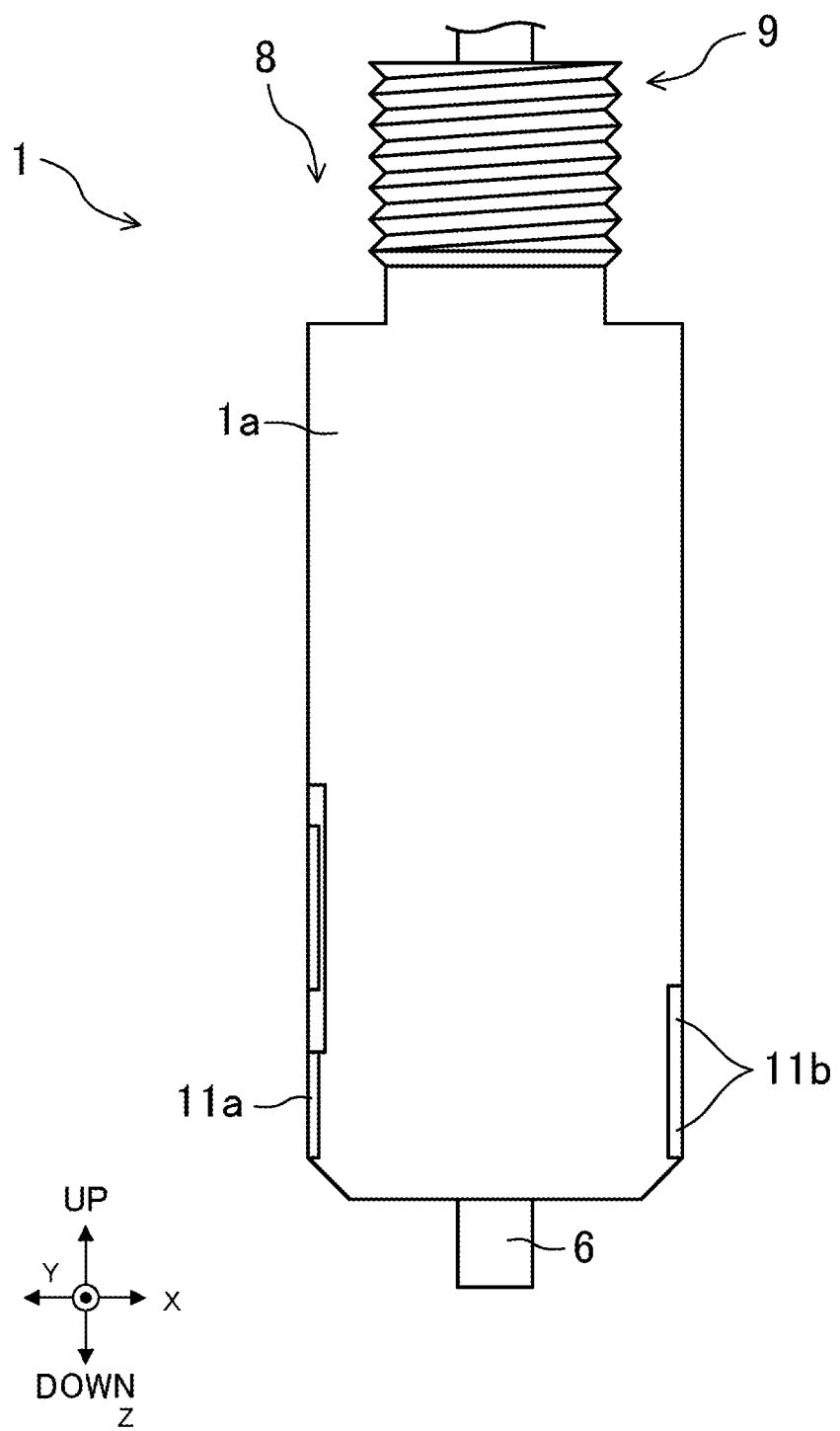

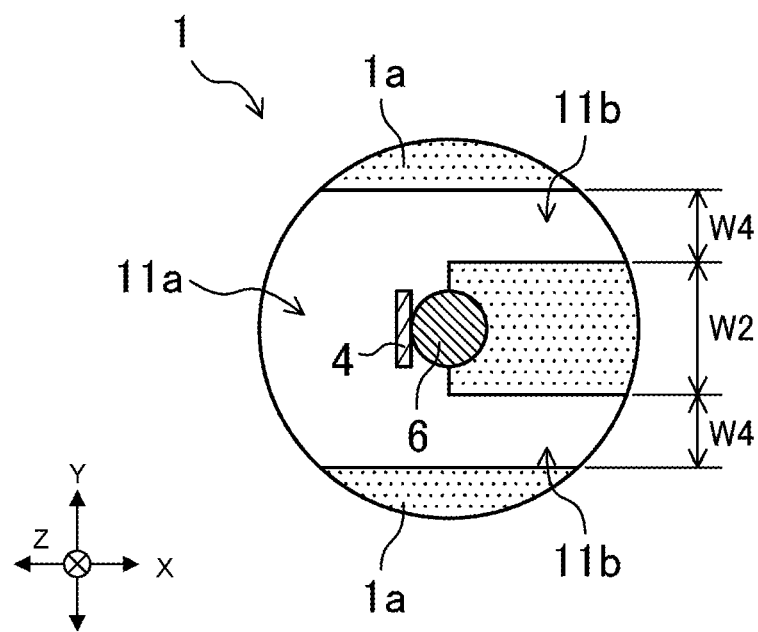

FIG.6
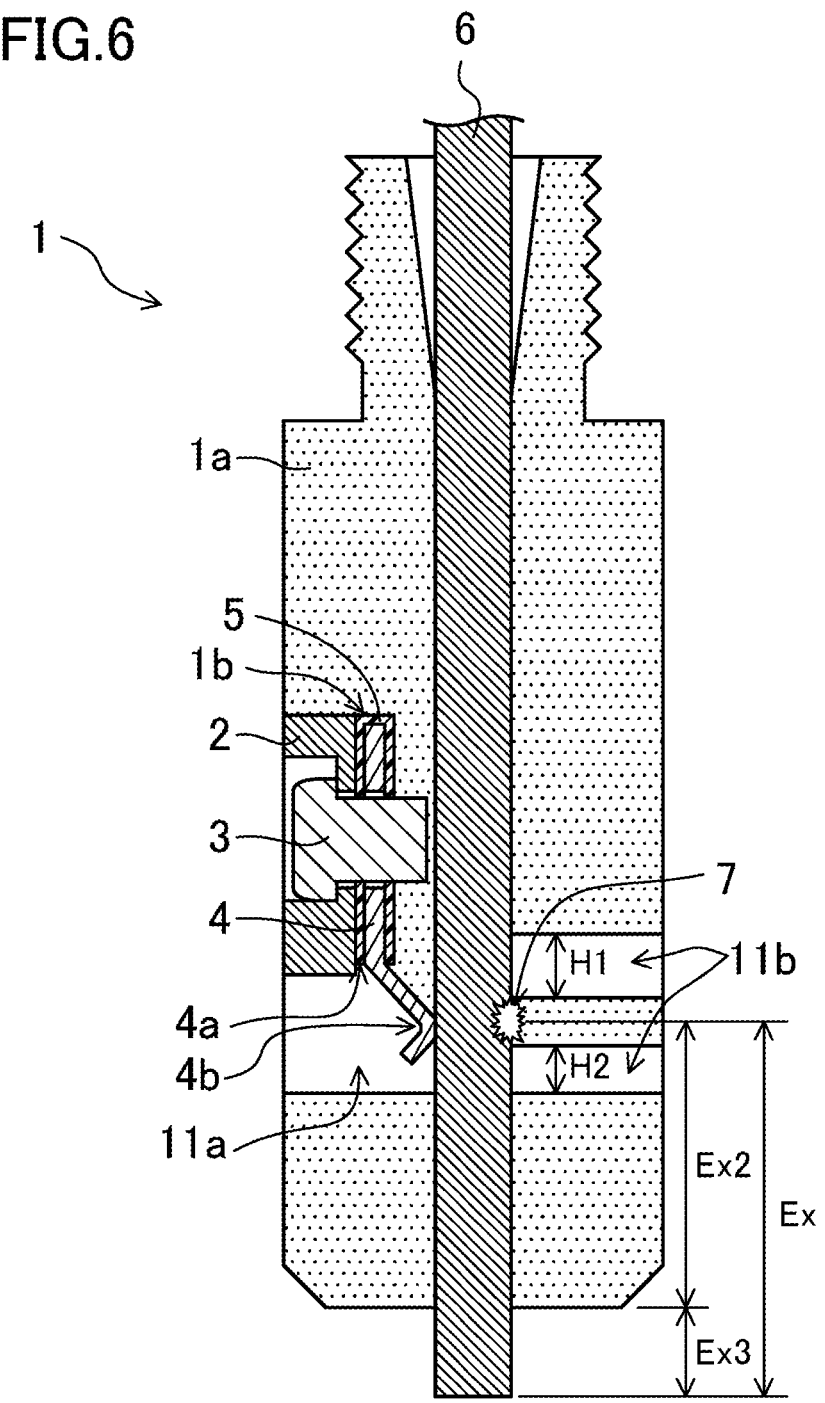
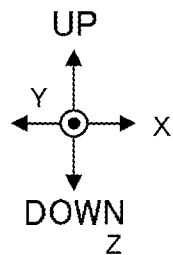

WELDING TIP

CROSS-REFERENCE TO RELATED APPLICATIONS

This is a continuation of International Application No. PCT/JP2018/43418 filed on Nov. 26, 2018. The entire disclosures of this application is incorporated by reference herein.

TECHNICAL FIELD

The present invention relates to a welding tip that feeds a current to a welding wire which is a consumable electrode.

BACKGROUND ART

In arc welding using a consumable electrode, a wire feeder feeds a welding wire to a welding torch, and a welding current is supplied to the welding wire from a welding machine via a contact tip, which is a welding tip, disposed at the distal end of the welding torch. The contact tip has a wire insertion bore along the central axis, and the welding wire is inserted therethrough. The welding wire is fed to the wire insertion bore toward the distal end of the contact tip to reach a certain position of a work at which arc welding is performed.

If the welding wire is wound around a reel, the welding wire is likely to curl due to the winding. For this reason, if the wire insertion bore becomes large due to the wear of the welding chip during welding, the welding wire is not positioned in the wire insertion bore. As a result, the contact area between the welding wire and a distal end portion of the welding tip varies. This is because sparks are produced between the welding wire and the wire insertion bore, and the inner surface of the wire insertion bore becomes uneven. Such unevenness reduces the current feed efficiency and is more likely to cause burn-back (explosive sound of electrode) and sputtering (generation of a sputtered film of electrode). At the same time, the unevenness in the inner surface of the wire insertion bore increases the frictional resistance between the wire insertion bore and the welding wire moving therethrough, which leads to insufficient wire feed and results in welding defects. To avoid such problems, Patent Document 1 discloses a configuration of ensuring contact of the welding wire with the contact tip.

Patent Document 1 discloses a typical contact tip 101 made of copper or a copper-chrome alloy, and as illustrated in FIG. 8, the contact tip 101 has a wire insertion bore 106 along the central axis, and a welding wire 105 is inserted therethrough. The wire insertion bore 106 has a narrowing, tapered orifice 107 at an inlet for the welding wire 105 having a large diameter to easily guide the welding wire 105 into the contact tip 101, and a tapered orifice 108 widening toward the distal end at an outlet for the welding wire 105 to easily remove the welding wire 105 from the wire insertion bore 106 if deposited.

The contact tip 101 has a mount portion 102 at the upper end to attach the contact tip 101 to an electrode of a torch (not illustrated) and a cone-shaped welding end portion 103 at the lower end. The mount portion 102 has threads 104 with which the contact tip 101 is screwed to the electrode.

The welding wire 105 is wound around a wire reel 109. The welding wire 105 is guided from the wire reel 109 to the wire insertion bore 106 via wire feed rollers 111, 111 rotationally driven by a wire feed motor 110. The welding wire 105 then enters the narrowing, tapered orifice 107 of the wire insertion bore 106 and is fed to the taper orifice 108.

The contact tip 101 has an aperture 112 along the wire insertion bore 106. The aperture 112 accommodates a leaf spring 113. The leaf spring 113 has a front end 114 embedded in the contact tip 101, a rear end 115 inserted in a recess 116 disposed in communication with the aperture 112, and a center protruding portion 117 extending in the aperture 112 to protrude into the wire insertion bore 106. The center protruding portion 117 of the leaf spring 113 is energized to press the welding wire 105 onto the inner surface of the wire insertion bore 106.

CITATION LIST

Patent Documents

Patent Document 1: Japanese Unexamined Patent Publication No. H10-034341

SUMMARY OF THE INVENTION

Technical Problem

In the typical contact tip 101 above, a current flows through the leaf spring 113 pressing the welding wire 105, which causes sparks between the welding wire 105 and the center protruding portion 117 serving as a pressing portion of the leaf spring 113. This further causes the wear of the contact tip 101. Specifically, the rear end 115, which corresponds to an end portion of the leaf spring 113 on the tip distal end side, is inserted and retained in the recess 116 provided in the contact tip 101, and the width of the leaf spring 113 in the radial direction is substantially equal to that of the aperture 112 in the radial direction. With this configuration, if the welding wire 105 moves upward and downward, wear particles of the welding wire 105 are created. The wear particles are prone to be deposited close to the upper surface of the recess 116 by their weights. The deposition of the wear particles around the leaf spring 113, specifically on a contact portion with the contact tip 101, which is on the tip distal end side, inhibits the movement of the leaf spring 113. Accordingly, the pressing force of the leaf spring 113 to the welding wire 105 decreases, and the current fed to the welding wire fluctuates. This may reduce the service life of the contact tip 101.

The present invention has been made in view of the foregoing, and it is an object of the present invention to provide a welding tip that can discharge wear particles to the outside to increase its service life.

Solution to the Problem

To achieve the object above, a welding tip according to the present invention has a wire insertion bore along a central axis, the wire insertion bore having a feeding point on an inner circumferential surface to feed a current to a welding wire extending through the wire insertion bore and fed upward or downward. The welding tip includes a tip body having the wire insertion bore; and a pressing part configured to press the welding wire to abut on the feeding point. The tip body has an aperture on an outer circumferential surface of the tip body on a distal end side of the tip body. The pressing part is accommodated in the aperture, the pressing part having a first end that is a free end disposed on the distal end side of the tip body and a second end opposite to the first end and fixed to the tip body. The aperture includes a first aperture accommodating the pressing part, and a second aperture disposed in communication with the first aperture and configured to discharge wear particles created at the feeding point during welding to outside. The second aperture includes a plurality of apertures that are axially aligned at opposite relative both sides in axially with respect to the feeding point with a predetermined distance between the apertures.

This configuration allows wear particles created during welding to be discharged to the outside, thereby avoiding the wear particles from inhibiting the movement of the pressing part. Thus, the reduction in the pressing force of the pressing part onto the welding wire can be avoided, thereby increasing the service life of the tip.

Further, the configuration can ensure discharge of the wear particles to the outside.

The second aperture may include a plurality of apertures that are aligned in a circumferential direction of the tip body and disposed at both sides in the circumferential direction with respect to the feeding point to open in a pressing direction of the pressing part.

This configuration of disposing the second aperture at, in particular, a height substantially equal to the height at which the feeding point is disposed can ensure discharge of the wear particles to the outside.

In one preferred embodiment, the distance between the feeding point and a distal end of the welding wire is determined to be increased with an increase in diameter of the welding wire, and the distance is capped at an upper limit to generate stable arc during welding.

This configuration allows the amount of Joule heating to be regulated at the distal end of the welding wire and allows generation of stable arc during welding, thereby achieving a desired welding quality.

In one preferred embodiment, the welding tip further includes an insulator between the pressing part and the tip body to electrically insulate the pressing part from the tip body. More preferably, the insulator has a predetermined heat resistance and is made of ceramic, a resin, or a paper material.

This configuration can ensure contact of the welding wire with the feeding point and allows stable feed of current to the welding wire. This configuration can further avoid the deterioration of the insulator caused by the heat during arc welding.

In one preferred embodiment, the pressing part is a leaf spring, and more preferably, the pressing part has a contact point in abutment with the welding wire and the contact point has an angular shape or a flat shape.

This configuration can ensure contact of the welding wire with the feeding point and allows stable feed of current to the welding wire.

The welding wire has a diameter equal to or smaller than a width, in a radial direction of the welding wire, of a contact point of the pressing part in abutment with the welding wire.

This configuration allows the pressing part to firmly press the welding wire onto the feeding point.

In one preferred embodiment, the welding tip further includes a feeding member that is a member separate from the tip body and releasably mounted to the tip body, and the feeding member has the feeding point.

This configuration can ensure feed of current from the feeding point of the feeding member to the welding wire and allows the service life of the tip body to be increased by replacing the feeding member.

Advantages of the Invention

As described above, the welding tip according to the present invention can avoid the reduction in pressing force applied to the welding wire and thus can have a longer service life.

BRIEF DESCRIPTION OF THE DRAWINGS

FIG. 1C is a schematic sectional view taken along line IC-IC in FIG. 1B.

FIG. 2 is a schematic sectional view of a welding tip according to a first variation.

FIG. 3A is a side view of a welding tip according to a second variation.

FIG. 5D is a schematic cross-sectional view taken along line VD-VD in FIG. 5C.

FIG. 6 is a schematic sectional view of a welding tip according to a third embodiment of the present invention.

DESCRIPTION OF EMBODIMENTS

Embodiments of the present invention will be described in detail with reference to the drawings. The following description of advantageous embodiments is mere examples in nature, and is not at all intended to limit the scope, applications, or use of the present disclosure.

First Embodiment

Structure of Welding Tip

Figure 1A:
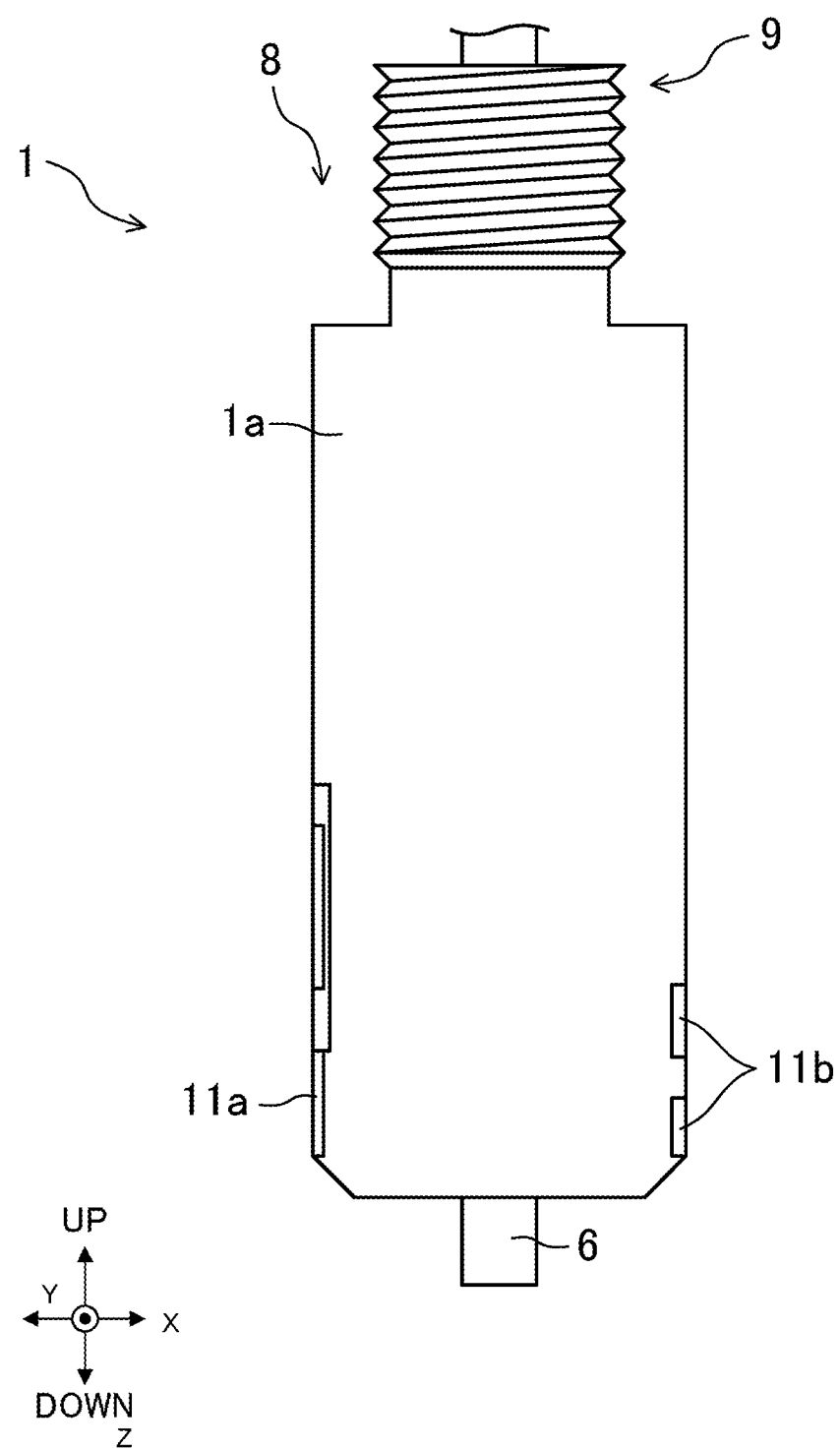
FIG. 1A is a side view of a welding tip according to a first embodiment of the present invention.
Figure 1B:
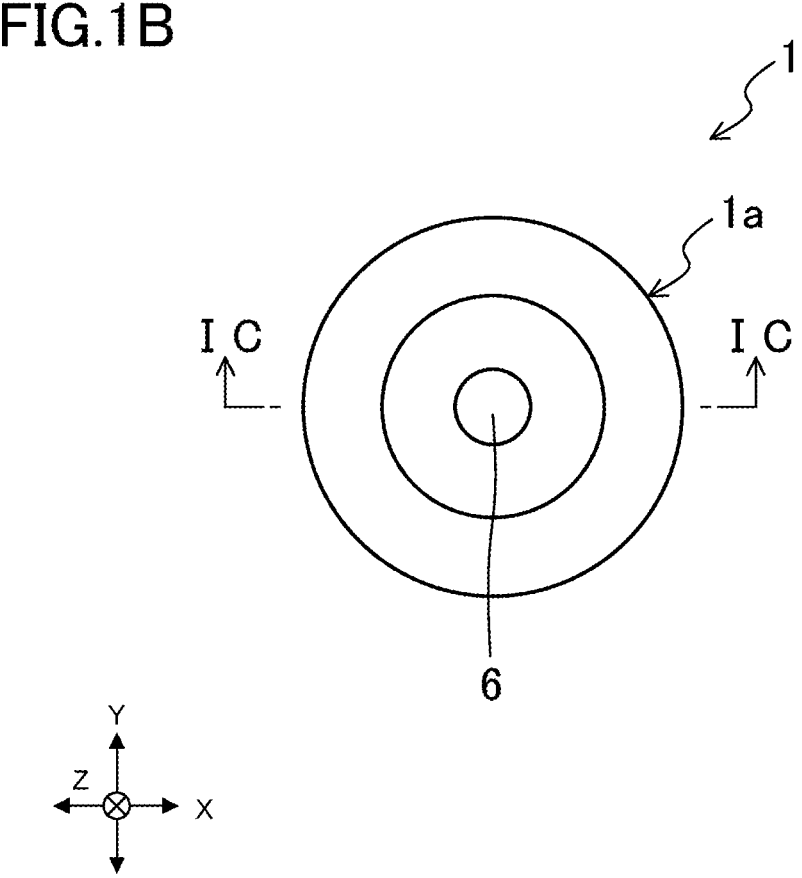
FIG. 1B is a bottom view of the welding tip.
Figure 1D:
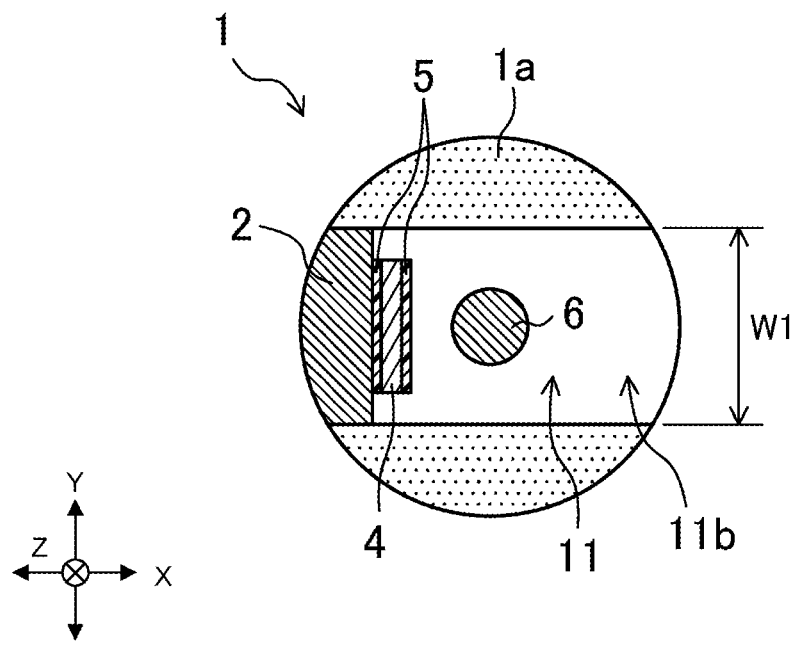
FIG. 1D is a schematic cross-sectional view taken along line ID-ID in FIG. 1C.
Figure 1E:
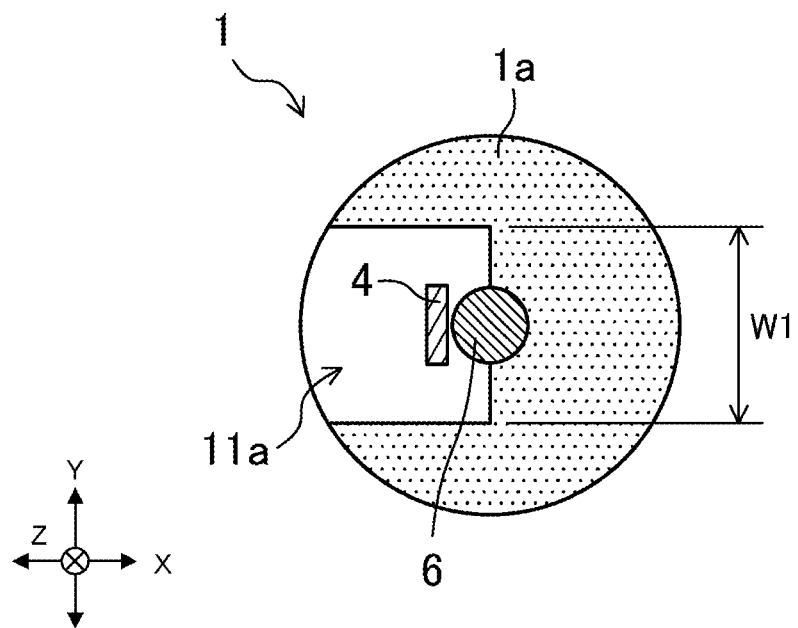
FIG. 1E is a schematic cross-sectional view taken along line IE-IE in FIG. 1C.

FIG. 1A is a side view of a welding tip according to this embodiment. FIG. 1B is a bottom view of the welding tip. FIG. 1C is a schematic sectional view taken along line IC-IC in FIG. 1B. FIG. 1D is a schematic cross-sectional view taken along line ID-ID in FIG. 1C. FIG. 1E is a schematic cross-sectional view taken along line IE-IE in FIG. 1C.

As illustrated in FIGS. 1A to 1E, this welding tip 1 includes a tip body 1a, a leaf spring (pressing part) 4, and an aperture 11. As illustrated in FIG. 1C, the distance between the distal end of a welding wire 6 and a feeding point to be described later is denoted by Ex, the distance between this feeding point 7 and the distal end surface of the tip body 1a is denoted by Ex1, and the distance between the distal end surface of the tip body 1a and the distal end of the welding wire 6 is denoted by Ex3. The distance Ex corresponds to the actual extension length of the welding wire 6. The distal end of the welding wire 6 corresponds to the position of the welding point in arc welding. It is apparent from FIG. 1C that the distance Ex is equal to the sum of the distance Ex1 and the distance Ex3.

In the following description, the extension direction of a wire insertion bore 10 may be referred to as a Z direction, the direction parallel to the direction in which the leaf spring 4 presses the welding wire 6 may be referred to an X direction, and the direction orthogonal to both X direction and Z direction may be referred to as a Y direction. The inlet side of the wire insertion bore 10 may be referred to as an "upper side", the outlet side of the wire insertion bore 10, or a distal end side of the welding tip 1, may be referred to as a "lower side".

The tip body 1a is made of copper or a copper-chrome alloy. The tip body 1a has the wire insertion bore 10 along the central axis, and the welding wire 6 is inserted therethrough. The wire insertion bore 10 has an upper tapered portion 10a having a diameter downwardly decreasing from the upper end that is the inlet for the welding wire 6, a straight portion 10b continuously connected to the upper tapered portion 10a and having a substantially constant diameter, and a lower tapered portion 10c continuously connected to the straight portion 10b and having a diameter downwardly increasing toward the lower end that is the outlet for the welding wire 6. The upper tapered portion 10a shaped as mentioned above facilitates guiding of the welding wire 6 to the wire insertion bore 10, and the lower tapered portion 10c shaped as mentioned above facilitates removal of the welding wire 6 even if the welding wire 6 is deposited on or around the outlet for the welding wire 6.

The tip body 1a has, at the upper end, a mount portion 8 to be attached to an electrode of a torch (not illustrated). The mount portion 8 has threads 9 with which the welding tip 1 is screwed to the electrode of the torch. When the welding wire 6 is in contact with a predetermined point (hereinafter referred to as the feeding point 7) on an inner surface of the wire insertion bore 10, a current is fed from the electrode of the torch to the welding wire 6 via the tip body 1a. The welding wire 6 is then heated by Joule heating, and arc is generated between the welding wire 6 and a work (not illustrated) that is a welding target.

The tip body 1a has the aperture 11 at the lower side, specifically on an outer circumferential surface on the distal end side. The aperture 11 includes a first aperture 11a accommodating the leaf spring 4 and second apertures 11b facing the first aperture 11a across the welding wire 6 and in communication with the first aperture 11a. The second apertures 11b are provided to discharge, for example, metal spatters emitted upon generation of sparks between the welding wire 6 and the feeding point 7 during arc welding and wear particles of the welding wire 6 created by friction between the welding wire 6 and the leaf spring 4 during feed of the welding wire 6, to the outside of the welding tip 1. The metal spatters and the wear particles of the welding wire 6 may be collectively referred to as "wear particles" in the following description. The "wear particles" also include wear particles of plating of the welding wire 6 scraped off by friction.

As illustrated in FIG. 1C, the leaf spring 4 has an upper end held and fixed to the tip body 1a and a second bent portion (contact point) 4b disposed in the first aperture 11a and in abutment with the welding wire 6. The leaf spring 4 has a lower end, specifically, an end on the distal end side of the tip body 1a, disposed in the first aperture 11a and not in connection with the tip body 1a. In other words, the end of the leaf spring 4 on the distal end side of the tip body 1a is a free end. As illustrated in FIGS. 1C and 1D, the second apertures 11b are disposed on the outer circumferential surface of the tip body 1a on the distal end side of the tip body 1a such that they are disposed at upper and lower sides relative to the feeding point 7 with a predetermined distance therebetween, or axially aligned at opposite relative both sides in axially with respect to the feeding point 7 with a predetermined distance therebetween. As illustrated in FIG. 1E, a portion of the tip body 1a disposed between the second apertures 11b surrounds the first aperture 11a in three directions. The welding wire 6 has a diameter equal to or smaller than the width of the second bent portion 4b of the leaf spring 4 in the Y direction. This configuration allows the leaf spring 4 to firmly press the welding wire 6 onto the feeding point 7. As illustrated in FIG. 1D, a portion of the leaf spring 4 held by the tip body 1a has a width in the Y direction larger than the width of the second bent portion 4b in the Y direction illustrated in FIG. 1E. However, the width of the leaf spring 4 in the Y direction illustrated in FIG. 1D may be equal to that of the second bent portion 4b in the Y direction.

Although, as illustrated in FIG. 1D, the second apertures 11b extend to the outer circumferential surface on the distal end side of the tip body 1a by a constant width W1, the second apertures 11b may have a tapered shape widening toward the outer circumferential surface. For example, the second apertures 11b may have a rounded or beveled shape.

In one preferred embodiment, the width of the second apertures 11b in the Y direction is larger than that of the welding wire 6. In this embodiment, for example, when the wire diameter φ is 1.2 mm, the second apertures 11b have heights H1, H2 in the Z direction of 1 mm to 5 mm, and a width W1 in the Y direction of 5 mm to 9.2 mm. The portion of the tip body 1a between the second apertures 11b, that is, the portion having the feeding point 7 has a thickness in the Z direction of about 3 mm to about 5 mm. Setting the dimensions to these values can ensure feed of current to the welding wire 6 even if the portion of the tip body 1a between the second apertures 11b has a thickness of 5 mm or less. However, if the thickness of this portion is 3 mm or less, the heat capacity of this portion becomes too small, and repeated welding processes may result in faster wear and shorter service life of the welding tip 1. The values above may vary as appropriate depending on, for example, the amount of current flowing through the welding wire 6 or the material or the size of the welding tip 1.

The leaf spring 4 is a flat member made of metal such as iron or stainless steel. The leaf spring 4 extends downward from the portion held by the tip body 1a and bends at a first bent portion 4a to extend toward the welding wire 6. The leaf spring 4 then bends at the second bent portion 4b that is an abutment portion on the welding wire 6 to extend away from the welding wire 6. A portion of the leaf spring 4 below the first bent portion 4a has an L-shape. This bend structure of the leaf spring 4 configures the second bent portion 4b as a contact point that presses the welding wire 6 onto the feeding point 7 with a certain pressing force. The material of the leaf spring 4 can avoid thermal deformation of the leaf spring 4 caused by the heat of arc welding, and thus, the leaf spring 4 can keep applying the pressing force onto the welding wire 6. If the leaf spring 4 is made of a copper alloy such as phosphor bronze, the leaf spring 4 may deform due to the heat of arc welding, leading to a smaller pressing force to the welding wire 6 or faster wear on the leaf spring 4. To apply sufficient pressing force, the leaf spring 4 needs to have a certain thickness of, for example, about 0.2 mm to 0.5 mm, in this embodiment. However, the thickness of the leaf spring 4 is not limited to the values above, and may vary as appropriate depending on, for example, the setting of the pressing force.

When the welding wire 6 is fed upward or downward, frictional resistance occurs between the welding wire 6 and the second bent portion 4b. To reduce the resistance, for example, the second bent portion 4b is bent at 90° with a bend allowance of 1 mm to 3 mm. In one preferred embodiment, the distance Ex1, which is illustrated in FIG. 1C, between the feeding point 7 and the distal end surface of the tip body 1a is about 2 mm to about 5 mm to avoid the leaf spring 4 from contacting the tip body 1a. These values, however, are not particularly limited, and may be any value that can reduce the frictional resistance and avoid a sharp edge on the second bent portion 4b. For example, the second bent portion 4b may be bent at any angle between 60° to 120°. The second bent portion 4b may be formed in an arc shape.

The portion of the leaf spring 4 held by the tip body 1a is provided with an insulator 5. The leaf spring 4 and the insulator 5 have an opening 4c and an opening 5a, respectively, through which a bolt 3 is inserted. The opening 4c of the leaf spring 4 has a larger diameter than the bolt 3 and has a certain clearance from the bolt 3 to avoid the leaf spring 4 from contacting the bolt 3, which will be described later. The opening 5a of the insulator 5 has a smaller diameter than the opening 4c of the leaf spring 4. The insulator 5 may be in contact with the bolt 3 at the opening 5a.

The insulator 5 is a sheet member made of, for example, ceramic, a resin, or paper and has a certain heat resistance. In one preferred embodiment, the insulator 5 is made of a material having a heat resistance at temperatures of, for example, 200° C. or higher. During arc welding, the temperature of the welding tip 1 rises to nearly 400° C. at the distal end. However, the temperature of the portion holding the leaf spring 4 rises to only about 200° C. The difference in temperature is because the tip body 1a is cooled while arc welding is stopped for, for example, transferring a torch to another weld point or exchanging a welding target. In this manner, the insulator 5 may have heat resistance to the above-described temperatures. The insulator 5 needs a certain thickness to have a certain insulation property. In this embodiment, for example, the insulator 5 has a thickness of about 0.05 mm to about 0.2 mm. However, the thickness is not limited to the values above and may vary as appropriate depending on, for example, the material of the insulator 5 or required dielectric voltage.

Providing the insulator 5 to the leaf spring 4 can electrically insulate the leaf spring 4 from the tip body 1a and the welding wire 6. There are two main reasons for the wear of the leaf spring 4 in the repetitions of arc welding. One is that, as described above, the leaf spring 4 is mechanically worn due to the feeding of the welding wire 6. The other one is that the leaf spring 4 is worn by arc generated between the welding wire 6 and the vicinity of the feeding point 7 while the current is fed. The latter is the dominant reason. Thus, providing the insulator 5 to the leaf spring 4 can avoid generation of arc. The insulator 5 also avoids generation of heat due to the current flowing through the leaf spring 4. In this manner, the leaf spring 4 can keep a certain pressing force for pressing the welding wire 6 onto the feeding point 7, and this enables desired arc welding. This configuration can also ensure feed of current to the welding wire 6 from the feeding point 7 disposed on the inner surface of the wire insertion bore 10 formed in the tip body 1a. Moreover, the insulator 5 on the leaf spring 4 avoids the wear particles from directly attaching to the leaf spring 4, and substantially avoids, for example, bonding of the leaf spring 4 with the welding wire 6 via the wear particles due to, for example, heat generated by the welding current. The welding wire 6, therefore, can be fed at a desired speed and pressed onto the feeding point 7, and a desired arc welding can be performed.

The tip body 1a has a recess 1b on the distal end side, and the recess 1b is in communication with the aperture 11. The leaf spring 4 provided with the insulator 5 is disposed on the bottom surface of the recess 1b, i.e., in this case, on a surface disposed inside the tip body 1a and parallel to the Z direction. A metal cover 2 having an opening is mounted from the outer side of the recess 1b. The leaf spring 4 is fixed to the tip body 1a by the metal bolt 3 inserted through the opening of the cover 2 and the opening 4c of the leaf spring 4 and fastened to the tip body 1a.

The welding wire 6 is wound around a wire reel, which is not illustrated, and is guided from the wire reel to the wire insertion bore 10 via wire feed rollers rotationally driven by a wire feed motor. The welding wire 6 is then fed to the welding point on the work through the wire insertion bore 10.

Advantages

As described above, the welding tip 1 according to this embodiment includes the tip body 1a having the wire insertion bore 10 along the central axis and the leaf spring 4 serving as a pressing part configured to press the welding wire 6 onto the feeding point 7 disposed on the inner surface of the wire insertion bore 10. The welding wire 6 is inserted in the wire insertion bore 10 and is fed with a current from the feeding point 7. The tip body 1a has the aperture 11 on the outer circumferential surface of the tip body 1a on the distal end side of the tip body 1a. The aperture 11 includes the first aperture 11a accommodating the leaf spring 4 and the second apertures 11b disposed in communication with the first aperture 11a and configured to discharge wear particles generated during welding to the outside. The leaf spring 4 is accommodated in the first aperture 11a of the aperture 11. The leaf spring 4 has a free first end disposed on the distal end side of the tip body 1a, and a second end opposite to the first end and fixed to the tip body 1a.

The configuration of the welding tip 1 described above can ensure contact of the welding wire 6 with the feeding point 7 and allows stable feed of current to the welding wire 6. The welding tip 1 is configured to discharge wear particles from the outer circumferential surface to the outside. This configuration can avoid the wear particles from attaching to the leaf spring 4 and depositing, for example, on the contact point of the leaf spring 4 or inside the wire insertion bore 10. In particular, the lower end of the leaf spring 4 accommodated in the first aperture 11a, that is, the first end of the leaf spring 4 disposed on the distal end side of the tip body 1a is a free end not fixed to the tip body 1a, and the tip body 1a has no contact portion such as the contact portion between the contact tip 101 and the lower end of the leaf spring 113 as disclosed in Patent Document 1. This configuration avoids the wear particles from inhibiting the movement of the leaf spring 4 even if the wear particles fall on the lower surface of the first aperture 11a by their own weights. In this manner, the leaf spring 4 can keep applying the pressing force onto the welding wire 6, which can then increase the service life of the welding tip 1. This configuration can also allow stable feed of current to the welding wire 6.

The second apertures 11b are disposed on the outer circumferential surface of the tip body 1a on the distal end side of the tip body 1a. Thus, the aperture 11 is shielded from the arc generated during welding by the distal end portion of the tip body 1a. This configuration can protect the leaf spring 4 from direct exposure to high temperature atmosphere, and thus can avoid thermal degradation of the leaf spring 4 and can increase the service life of the welding tip 1.

Use of the leaf spring 4 as the pressing part allows the pressing part to firmly press the welding wire 6 onto the feeding point 7. Moreover, the leaf spring 4 as the pressing part can be installed and manufactured at lower costs. Compared to the typical configuration disclosed in Patent Document 1, the configuration according to this embodiment allows stable feed of current to the welding wire 6. The stable feed of current can avoid generation of unevenness on the inner surface of the wire insertion bore 10, and can also avoid burn-back or sputtering due to the reduction in current feed efficiency. The unevenness, if created on the inner surface of the wire insertion bore 10, increases frictional resistance in feeding of the welding wire 6. The increased resistance may fail to avoid desired wire feed and may cause welding defect. However, the configuration above can avoid such problems.

The pressing part may have another structure including a coil spring and an insulator. In this case, the insulator energized by the coil spring may press the welding wire 6 onto the feeding point 7. However, this structure requires, for example, a ceramic insulator and a ceramic cover 2 and increases the manufacturing costs, accordingly.

In one preferred embodiment, the diameter of the welding wire 6 is equal to or smaller than the width of the second bent portion (contact point) 4b of the leaf spring 4 in abutment with the welding wire 6 in a radial direction of the wire, i.e., in the Y direction. This configuration allows the leaf spring 4 to firmly press the welding wire 6 onto the feeding point 7.

The configuration of the welding tip 1 according to this embodiment is not complex, and allows the manufacturing processes such as assembly and machining to be facilitated. Thus, the welding tip 1 can be provided at a lower cost.

First Variation

FIG. 2 is a schematic sectional view of a welding tip according to this variation. The sectional view illustrated in FIG. 2 corresponds to the sectional view illustrated in FIG. 1C. In this variation, the same parts as those of the first embodiment are denoted by the same reference numerals, and the detailed description thereof is omitted. Similarly, in the embodiments and variations, which will be described later, the same parts as those of the first embodiments are denoted by the same reference numerals as required, and the detailed description thereof is omitted.

The configuration according to this variation differs from that according to the first embodiment illustrated in FIG. 1C in the shape of the second bent portion 4b of the leaf spring 4 that is an abutment portion on the welding wire 6.

Specifically, the second bent portion 4b illustrated in FIG. 1C has an angular shape bent at 90°, whereas the leaf spring 4 illustrated in FIG. 2 has a rectangular flat portion 4e between the second bent portion 4b and a third bent portion 4d, and the portion 4e serves as a contact point between the leaf spring 4 and the welding wire 6.

The shape of this contact point 4e of the leaf spring 4 in abutment with the welding wire 6 illustrated in FIG. 2 can further reduce the wear of the leaf spring 4 and can increase the service life of the welding tip 1. The pressing force applied on the welding wire 6 is determined by the stiffness of the leaf spring 4. If, for example, the leaf spring 4 is bent at the same angle, made of the same material, and has the same thickness, there is no significant change in the pressing force. However, the contact area of the leaf spring 4 with the welding wire 6 is increased, thereby reducing the pressure per unit area applied to the welding wire 6. The reduced pressure reduces the friction between the welding wire 6 and the leaf spring 4, generated during feed of the welding wire 6, and thus can reduce the wear of the leaf spring 4. In addition, the contact point 4e of the leaf spring 4 moves in the Z direction, and the feeding point 7 moves, accordingly. This configuration increases the area of the feeding point 7 and further the tip body 1a to be worn. This configuration can reduce the localized wear of the tip body 1a and can increase the service life of the welding tip 1. In this variation, the length of the contact point 4e of the leaf spring 4 in the Z direction is about 2 mm to about 5 mm, but is not limited to the particular values above and may vary as appropriate.

Since the contact point 4e of the leaf spring 4 moves in the Z direction along the welding wire 6, the output current to be fed to the welding wire 6 varies, accordingly. However, this variation in current is not significant in view of the total amount of current (e.g., 80 A to 350 A) flowing through the welding wire 6, and thus has no significant effect on the arc welding. As the wear of welding tip 1 having the typical configuration proceeds, the feeding point 7 moves upward in the wire insertion bore 10. Compared to the change in current flow in this case, the change in current flow according to this variation is small and about 5 A to 20 A. The contact point 4e of the leaf spring 4 may be any flat shape, and may not necessarily be a rectangular shape.

Second Variation

Figure 3B:
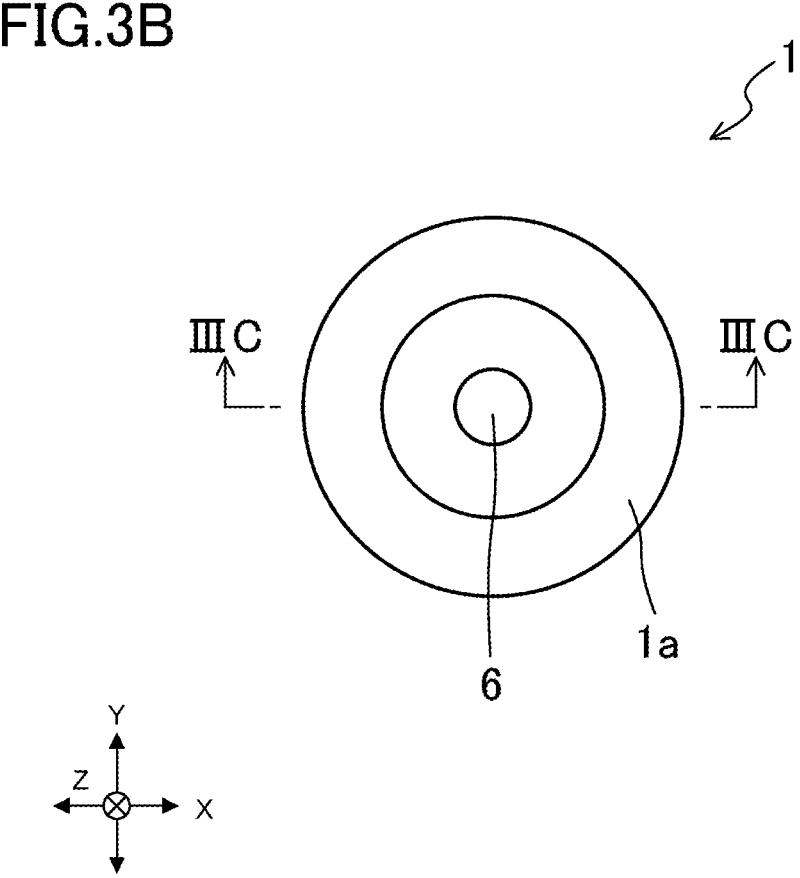
FIG. 3B is a bottom view of the welding tip according to the second variation.
Figure 3C:
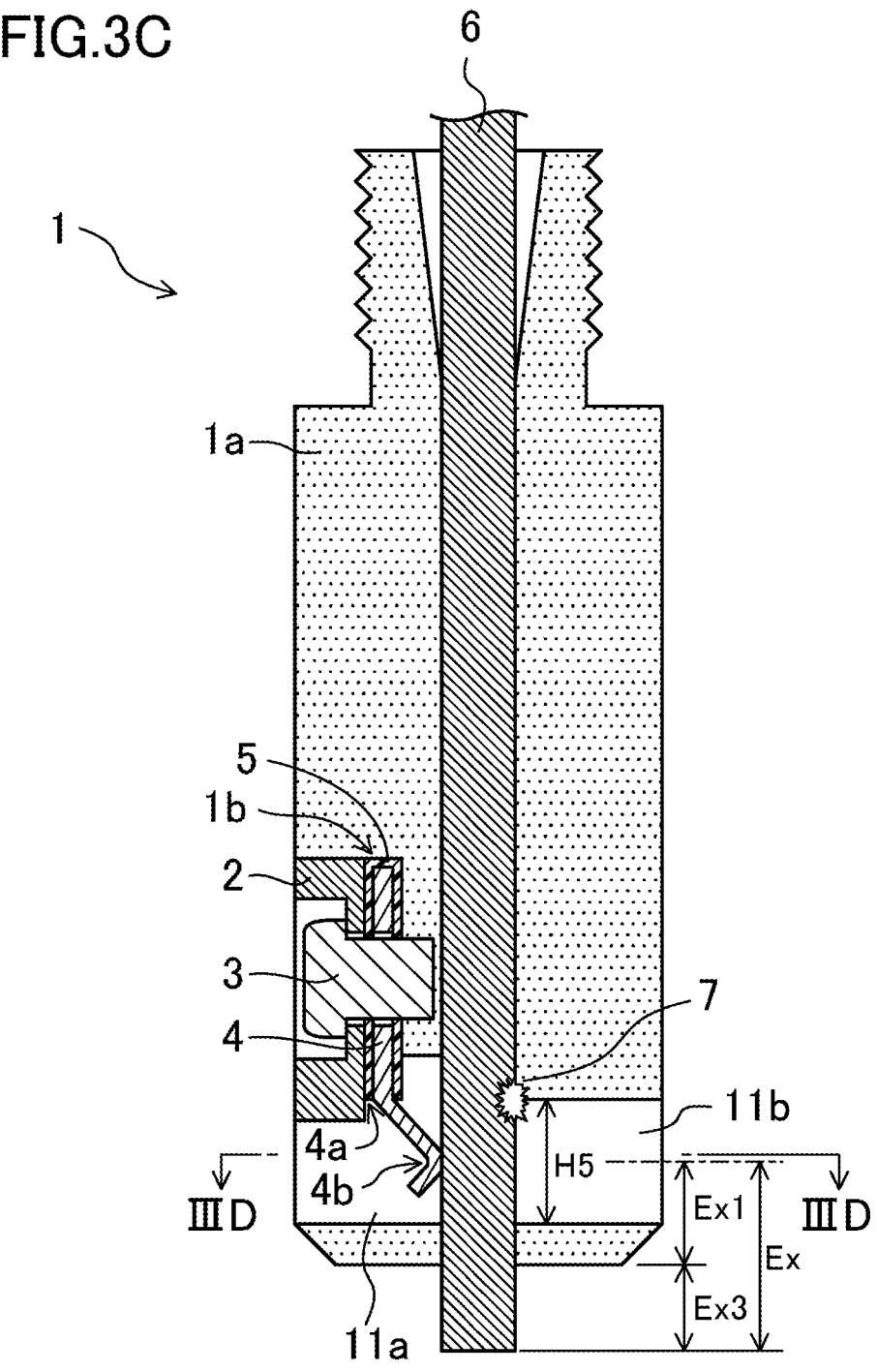
FIG. 3C is a schematic sectional view taken along line IIIC-IIIC in FIG. 3B.
Figure 3D:
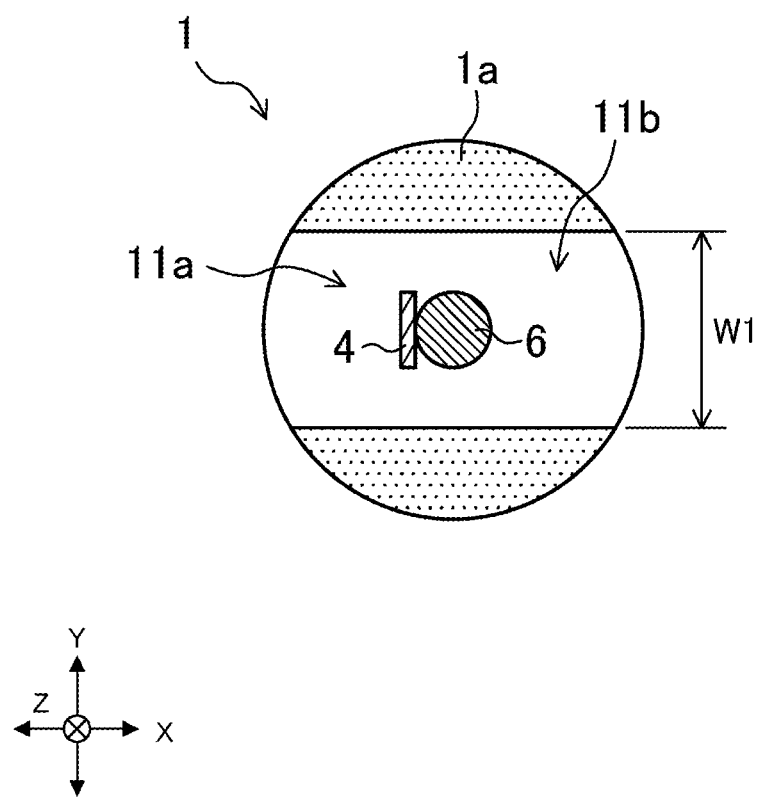
FIG. 3D is a schematic cross-sectional view taken along line IIID-IIID in FIG. 3C.

FIG. 3A is a side view of a welding tip according to a second variation. FIG. 3B is a bottom view of the welding tip. FIG. 3C is a schematic sectional view taken along line IIIC-IIIC in FIG. 3B. FIG. 3D is a schematic cross-sectional view taken along line IIID-IIID in FIG. 3C.

The configuration according to this variation differs from that of the first embodiment in that the welding tip 1 has a single second aperture 11b disposed below the feeding point 7, that is, disposed closer to the distal end of the tip body 1a than the feeding point 7. The feeding point 7 according to this variation is disposed on an inner surface of the wire insertion bore 10 and on the upper surface of the second aperture 11b in abutment with the welding wire 6.

This configuration of the welding tip 1 can also discharge wear particles from the outer circumferential surface of the welding tip 1 on the distal end side of the welding tip 1 to the outside and can avoid the wear particles from being attached or deposited on, for example, the contact point (second bent portion) 4b of the leaf spring 4. In this manner, the leaf spring 4 can keep applying the pressing force onto the welding wire 6, which can then increase the service life of the welding tip 1. This configuration also allows stable feed of current to the welding wire 6. In particular, since the feeding point 7 is not in a position opposite to the contact point 4b of the leaf spring 4 across the welding wire 6, the wear particles are less likely to remain in the wire insertion bore 10. This structure can ensure discharge of the wear particles to the outside of the welding tip 1.

Disposing the second apertures 11b closer to the distal end of the tip body 1a than the feeding point 7 as described in the first and second variations and the first embodiment can ensure discharge of fallen wear particles to the outside. The structures to be described below can have the same effect by disposing the second apertures 11b closer to the distal end side of the tip body 1a than the feeding point 7.

The second aperture 11b according to the second variation has a height 115 in the Z direction of about 1 mm to about 5 mm and a width W1 in the Y direction larger than the diameter of the welding wire 6. Specifically, the width W1 extends radially outward from the outer circumference of the welding wire 6 by about 1 mm to 2 mm. The values above may vary as appropriate depending on, for example, the amount of current flowing through the welding wire 6 or the material or the size of the welding tip 1.

Second Embodiment

Figure 4A:
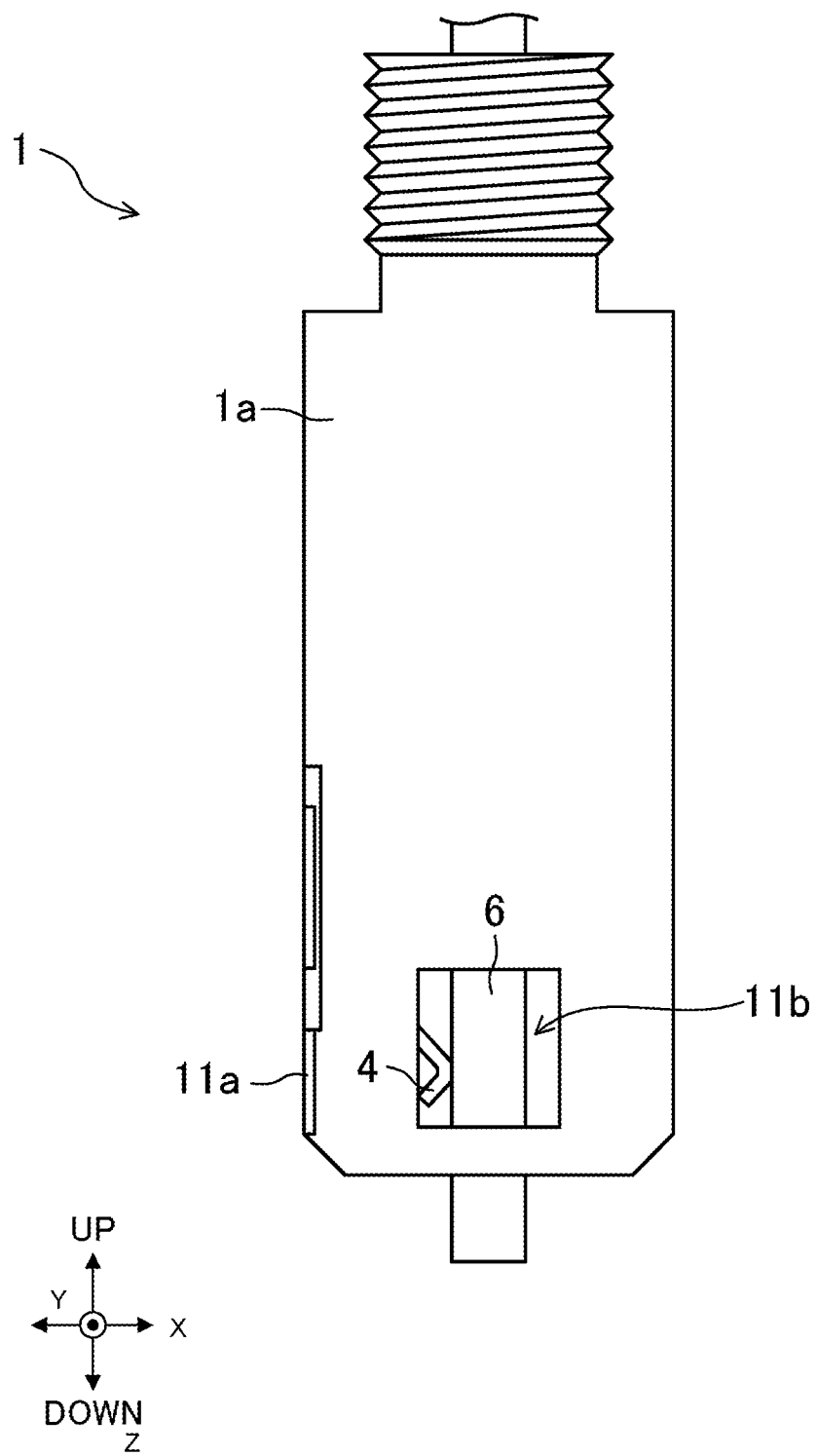
FIG. 4A is a side view of a welding tip according to a second embodiment of the present invention.
Figure 4B:
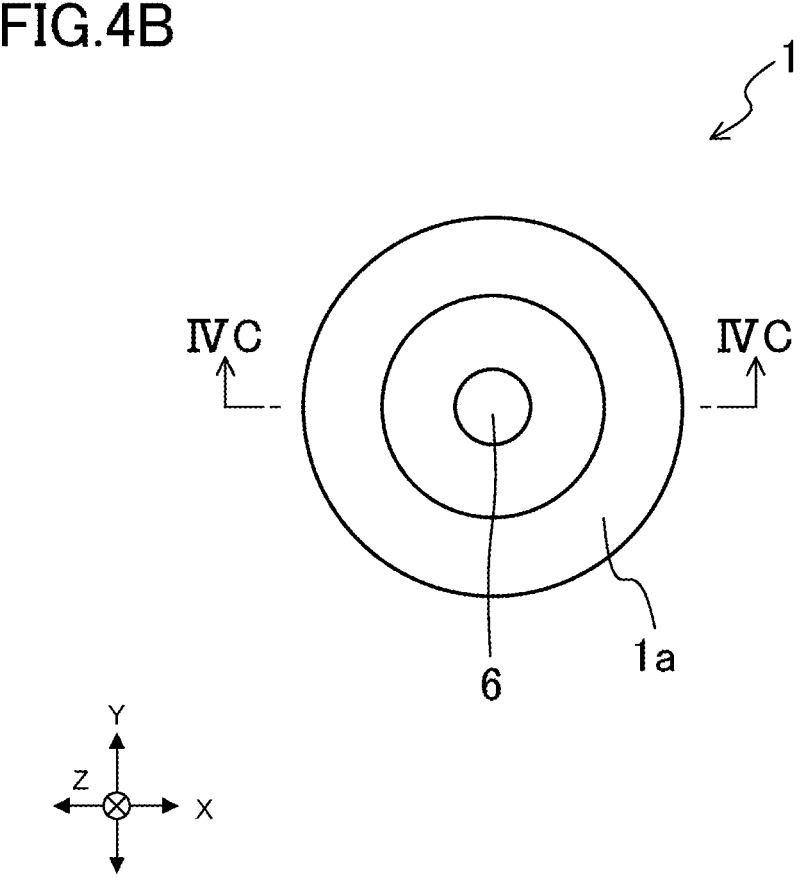
FIG. 4B is a bottom view of the welding tip.
Figure 4C:
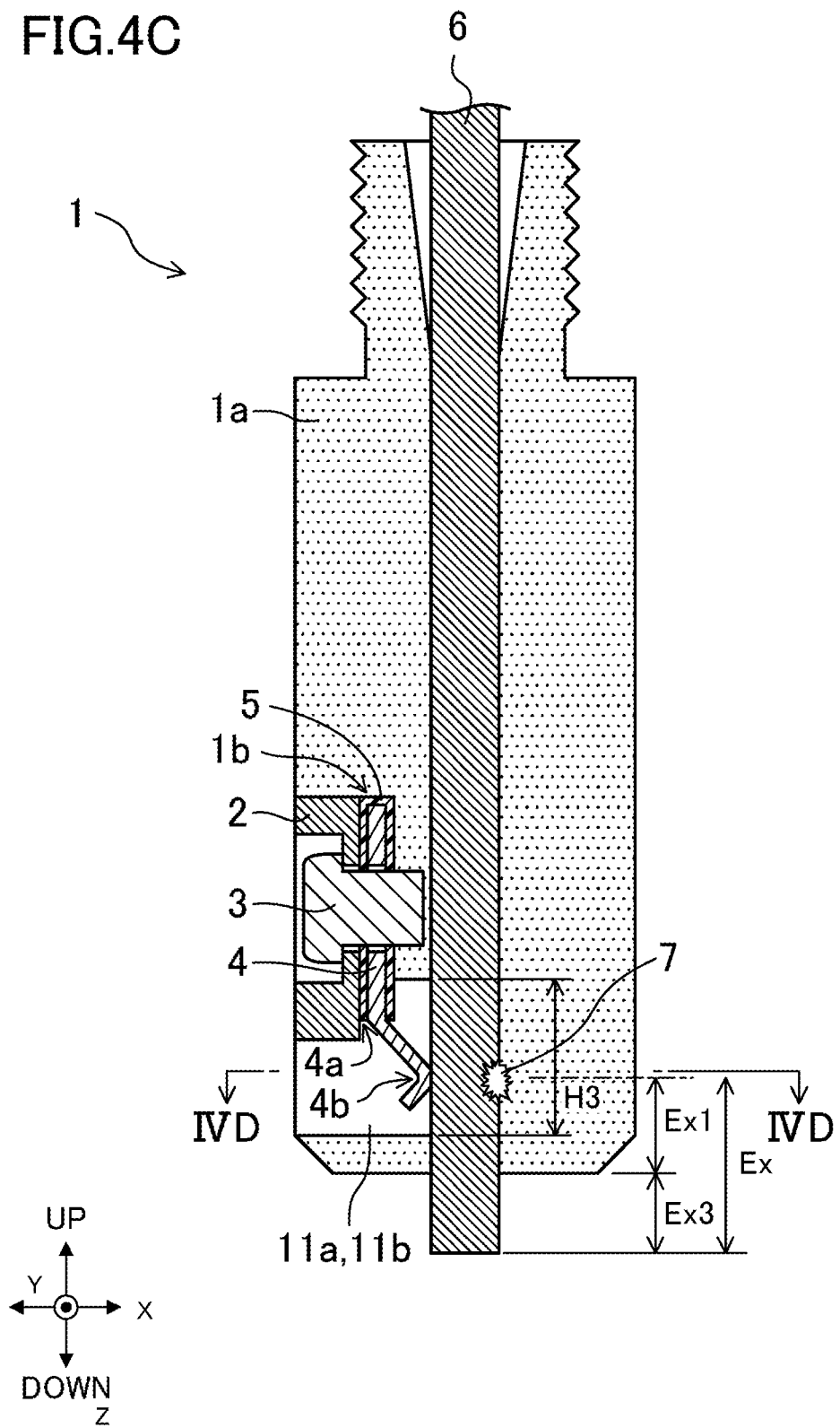
FIG. 4C is a schematic sectional view taken along line IVC-IVC in FIG. 4B.
Figure 4D:
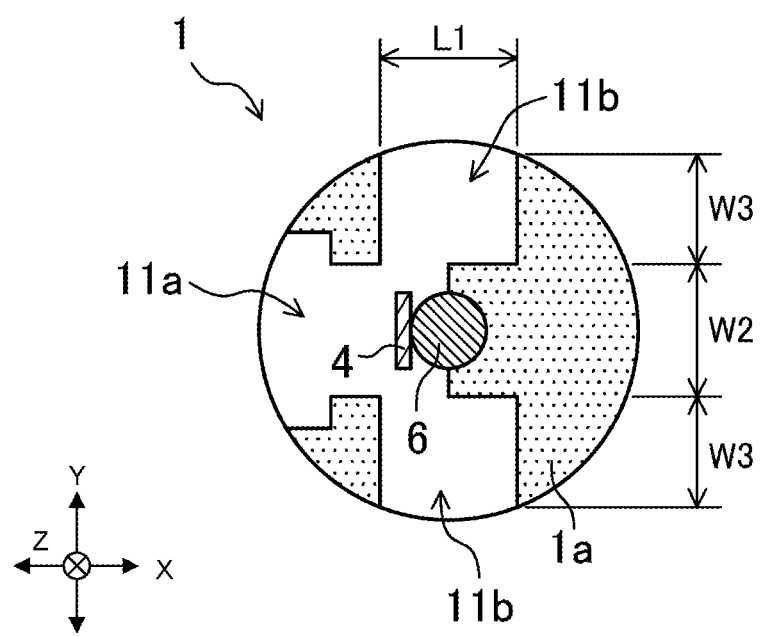
FIG. 4D is a schematic cross-sectional view taken along line IVD-IVD in FIG. 4C.

FIG. 4A is a side view of a welding tip according to a second embodiment. FIG. 4B is a bottom view of the welding tip. FIG. 4C is a schematic sectional view taken along line IVC-IVC in FIG. 4B. FIG. 4D is a schematic cross-sectional view taken along line IVD-IVD in FIG. 4C.

The configuration according to this embodiment differs from that according to the first embodiment in the positions of the two second apertures 11b. Specifically, configuration according to the first embodiment has a plurality of second apertures 11b that are axially aligned at opposite relative both sides in axially with respect to the feeding point 7 with a certain distance therebetween, whereas the configuration according to the second embodiment has a plurality of second apertures 11b that are aligned in the circumferential direction of the tip body 1a at both sides in the circumferential direction with respect to the feeding point 7 to open in a direction crossing the pressing direction of the leaf spring 4, specifically, in this case, in the Y direction.

As illustrated in FIGS. 4C and 4D, the second apertures 11b according to the second embodiment extend in the Y direction with the feeding point 7 therebetween. The second apertures 11b have a height H3 in the Z direction extending 1 mm to 5 mm both above and below the feeding point 7. In one preferred embodiment, assuming that the width, in the Y direction, of a portion of the tip body 1a having the feeding point 7 is W2 and the width, in the Y direction, of the second apertures 11b disposed at the opposite sides of the portion is W3, the width W2 is larger than the diameter of the welding wire 6 to ensure contact of the feeding point 7 with the welding wire 6. Specifically, it is preferred that the width W2 is radially outwardly larger by about 0.5 mm to 2 mm from the outer circumference of the welding wire 6. If the width W2 is outwardly larger in the radial direction of the tip body 1a by about 0.5 mm from the outer circumference of the welding wire 6, a sufficient contact area can be provided between the welding wire 6 and the feeding point 7. When the width W2 is larger than this value, the feeding point 7 can have sufficient heat capacity and this can reduce the wear of the tip body 1a. In one preferred embodiment, the width W3 extends about 0.5 mm to about 2 mm from the opposite ends of the width W2 in the Y direction. For example, when the diameter φ of the welding wire 6 is 1.2 mm, the height H3 of the second apertures 11b in the Z direction is about 2 mm to about 10 mm, and the width W3 extends about 0.5 mm to about 2 mm from the opposite ends of the width W2 in the Y direction. The second apertures 11b have a width L1 in the X direction of about 4 mm to about 6 mm. The values above may vary as appropriate depending on, for example, the amount of current flowing through the welding wire 6 or the material or the size of the welding tip 1.

The second apertures 11b shaped as mentioned above can discharge the wear particles created during welding to the outside of the welding tip 1, which can then increase the service life of the welding tip 1. Specifically, the second apertures 11b are aligned in the circumferential direction of the tip body 1a and disposed at both sides in the circumferential direction with respect to the feeding point 7 to open in the Y direction, and this configuration can ensure discharge of metal sputters created around the feeding point 7 to the outside of the welding tip 1. The second apertures 11b extend closer to the distal end of the tip body 1a than the feeding point 7, and this configuration can ensure discharge of fallen wear particles to the outside.

Although the second apertures 11b extend to the outer circumferential surface of the tip body 1a on the distal end side of the tip body 1a at the constant width L1, the second apertures 11b may have a tapered shape widening toward the outer circumferential surface in the same manner as described in the first embodiment. For example, the second apertures 11b may have a rounded or beveled shape.

Third Variation

Figure 5A:
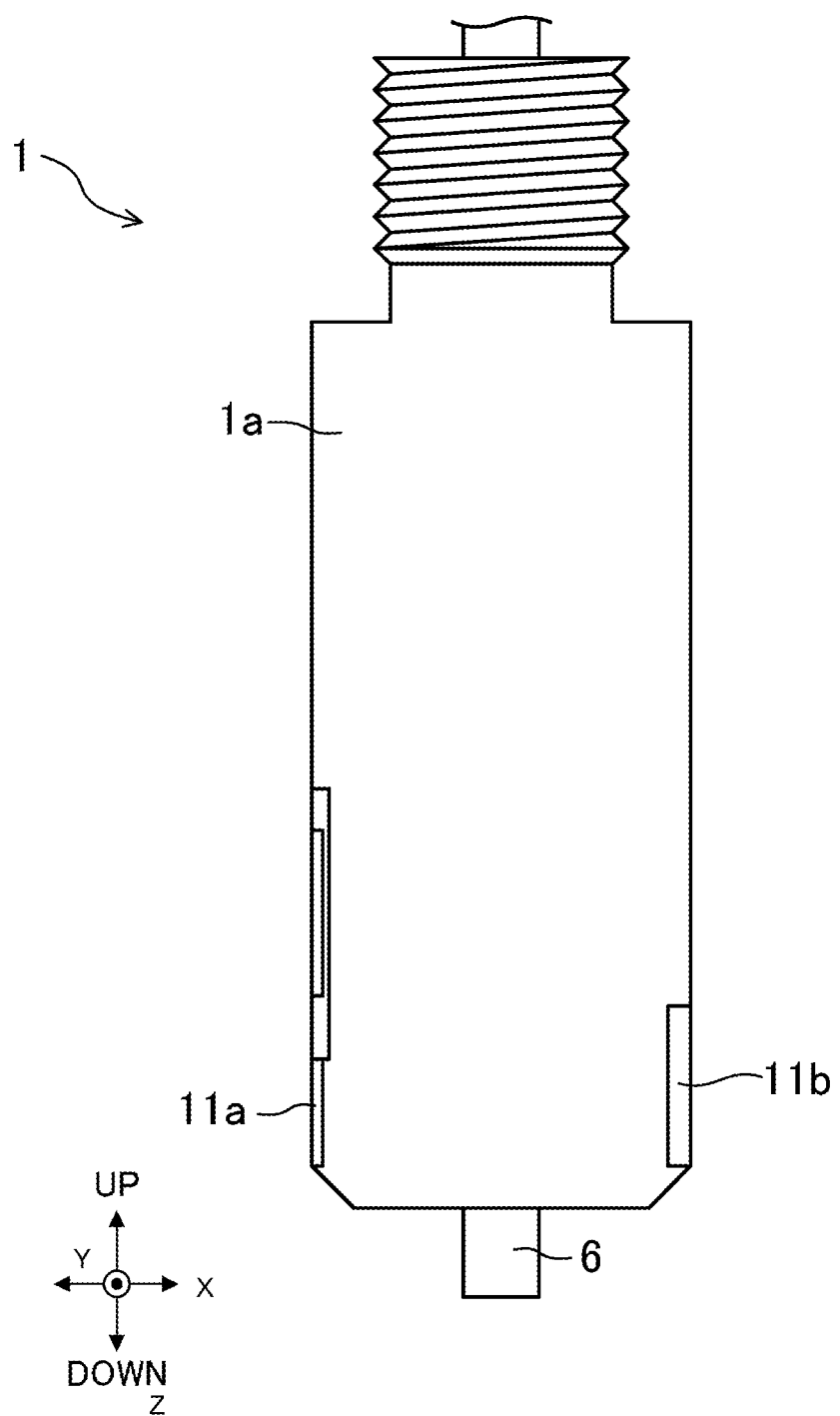
FIG. 5A is a side view of a welding tip according to a third variation.
Figure 5B:
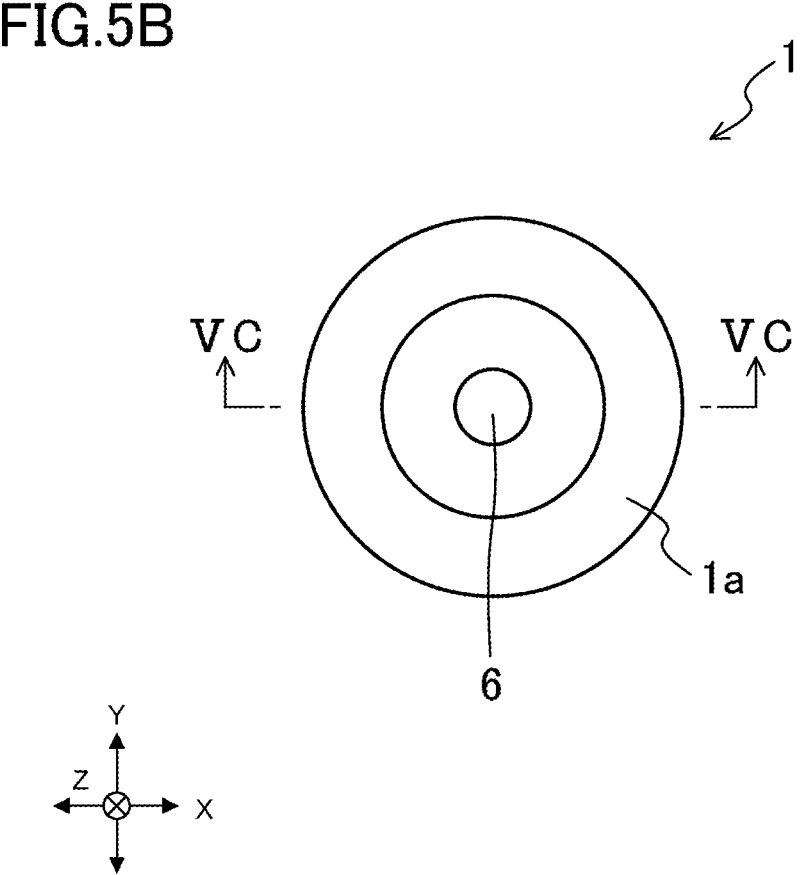
FIG. 5B is a bottom view of the welding tip.
Figure 5C:
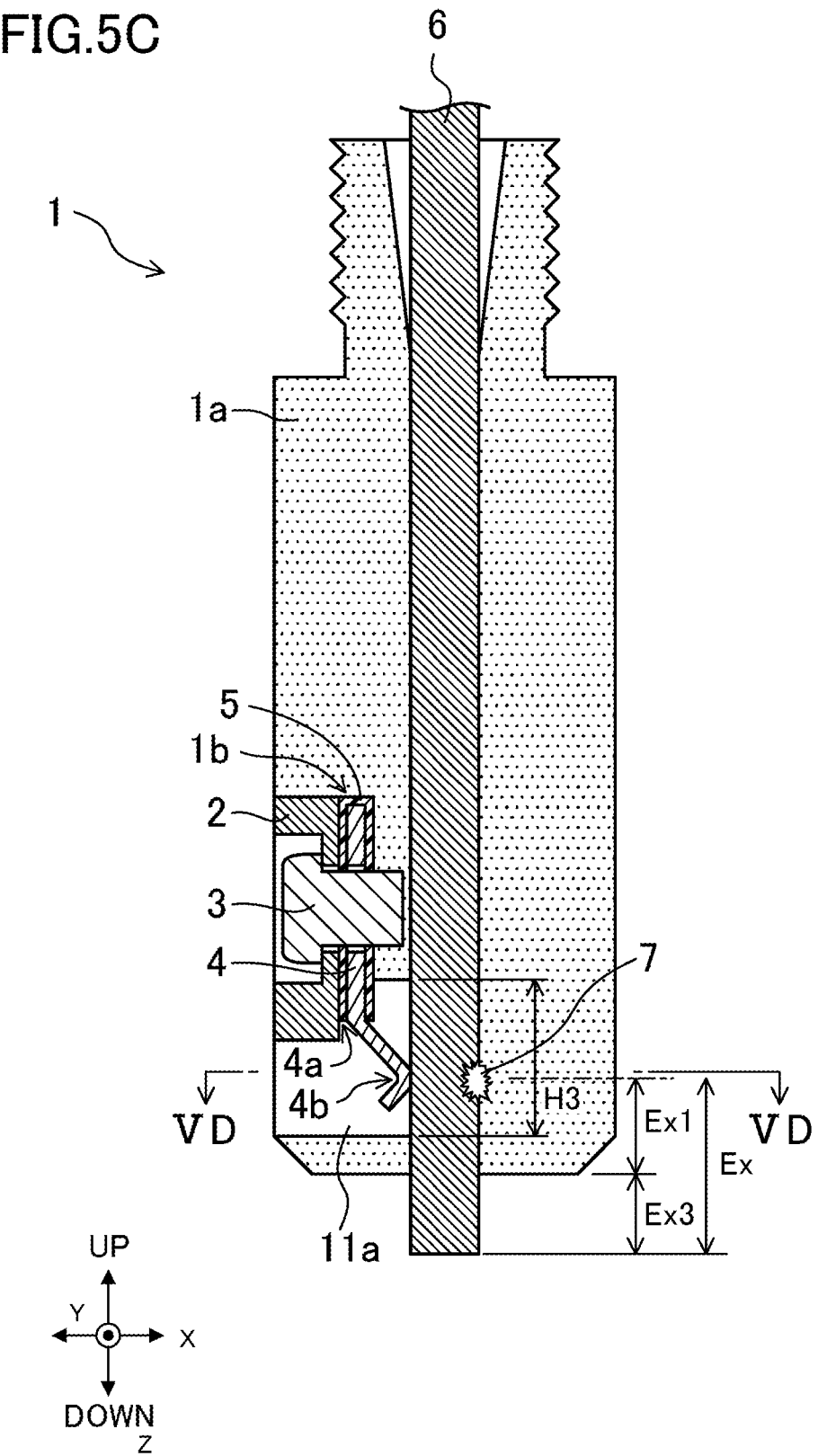
FIG. 5C is a schematic sectional view taken along line VC-VC in FIG. 5B.

FIG. 5A is a side view of a welding tip according to a third variation. FIG. 5B is a bottom view of the welding tip. FIG. 5C is a schematic sectional view taken along line VC-VC in FIG. 5B. FIG. 5D is a schematic cross-sectional view taken along line VD-VD in FIG. 5C.

The configuration according to this variation differs from that according to the second embodiment in the positions of the two second apertures 11b. Specifically, the second apertures 11b according to the second embodiment are aligned in the circumferential direction of the tip body 1a and disposed at both sides in the circumferential direction with respect to the feeding point 7 to open in the Y direction that is a direction crossing the pressing direction of the leaf spring 4, whereas the second apertures 11b according to this variation are aligned in the circumferential direction of the tip body 1a and disposed at both sides in the circumferential direction with respect to the feeding point 7 to open in the X direction that is the pressing direction of the leaf spring 4. The height H3 of the second apertures 11b in the Z direction and the width W2 of the portion of the tip body 1a having the feeding point are the same values as those described in the second embodiment. The width W4 of the second apertures 11b in the Y direction is the same as the width W3 of the second embodiment. The values above may vary as appropriate depending on, for example, the amount of current flowing through the welding wire 6 or the material or the size of the welding tip 1.

This configuration of the welding tip 1 described above allows wear particles to be discharged from the outer circumferential surface of the welding tip 1 on the distal end side of the welding tip 1 to the outside and can avoid the wear particles from being attached to, for example, the contact point of the leaf spring 4 or deposited inside the wire insertion bore 10. In this manner, the leaf spring 4 can keep applying the pressing force onto the welding wire 6, which can then increase the service life of the welding tip 1. This configuration also allows stable feed of current to the welding wire 6.

Third Embodiment

FIG. 6 is a schematic sectional view of a welding tip according to a third embodiment. The sectional view illustrated in FIG. 6 corresponds to the sectional view illustrated in FIG. 1C.

The configuration according to this embodiment differs from that according to the first embodiment in the distance between the feeding point 7 and the distal end surface of the tip body 1a. This distance Ex2 according to this embodiment is longer than the distance Ex1 according to the first embodiment.

The distance Ex1 according to the first embodiment is about 2 mm to about 5 mm, whereas the distance Ex2 according to this embodiment is, for example, 5 mm or larger to 30 mm or smaller. Assuming that, for example, the diameter φ of the welding wire 6 is 1.2 mm and the distance Ex3 is 10 mm or larger to 15 mm or smaller, it is preferred that the distance Ex2 is 10 mm or larger to 15 mm or smaller and the distance Ex is 20 mm or larger to 25 mm or smaller. If the distance Ex, which is the actual wire extension length, is smaller than 20 mm, the amount of Joule heating may become too low to perform desired welding. If the distance Ex is larger than 25 mm, the amount of Joule heating becomes excessively large, leading to excessive melting of the welding wire 6 and resulting in an unstable arc.

Assuming that the diameter φ of the welding wire 6 is 1.4 mm and the distance Ex3 is 10 mm or larger to 15 mm or smaller, it is preferred that the distance Ex2 is 10 mm or larger to 15 mm or smaller and the distance Ex is 25 mm or larger to 30 mm or smaller. When the distance Ex, which is the actual wire extension length, is smaller than 25 mm, the amount of Joule heating may become too low to perform desired welding. When the distance Ex is larger than 30 mm, the amount of Joule heating becomes excessively large, leading to excessive melting of the welding wire 6 and resulting in an unstable arc.

As described above, the distance Ex that is the actual extension length of the welding wire 6 can be increased with the increase in the distance Ex2. For example, the distance Ex2 is determined to be increased with the increase in the diameter of the welding wire 6, and capped at an upper limit to generate stable arc during welding. This can bring the distance Ex, which is the extension length, be an appropriate value. Setting an appropriate distance Ex enables the Joule heat generated at the welding wire 6 to fall within a predetermined range and allows generation of stable arc during welding and a desired welding to be performed. The increase in the amount of heat generated at the welding wire 6 can increase, for example, the wire feed speed at the same amount of current flowing through the welding wire 6. The faster wire feed speed can increase the welding speed and thus can reduce cycle time. The increased amount of heat can increase the amount of metal to be fused and thus can improve the welding quality.

However, the distance Ex2 is not limited to the range above, and may vary as appropriate depending on, for example, the diameter of the welding wire 6 and the distance between the distal end surface of the tip body 1a and the welding point.

Fourth Embodiment

Figure 7:
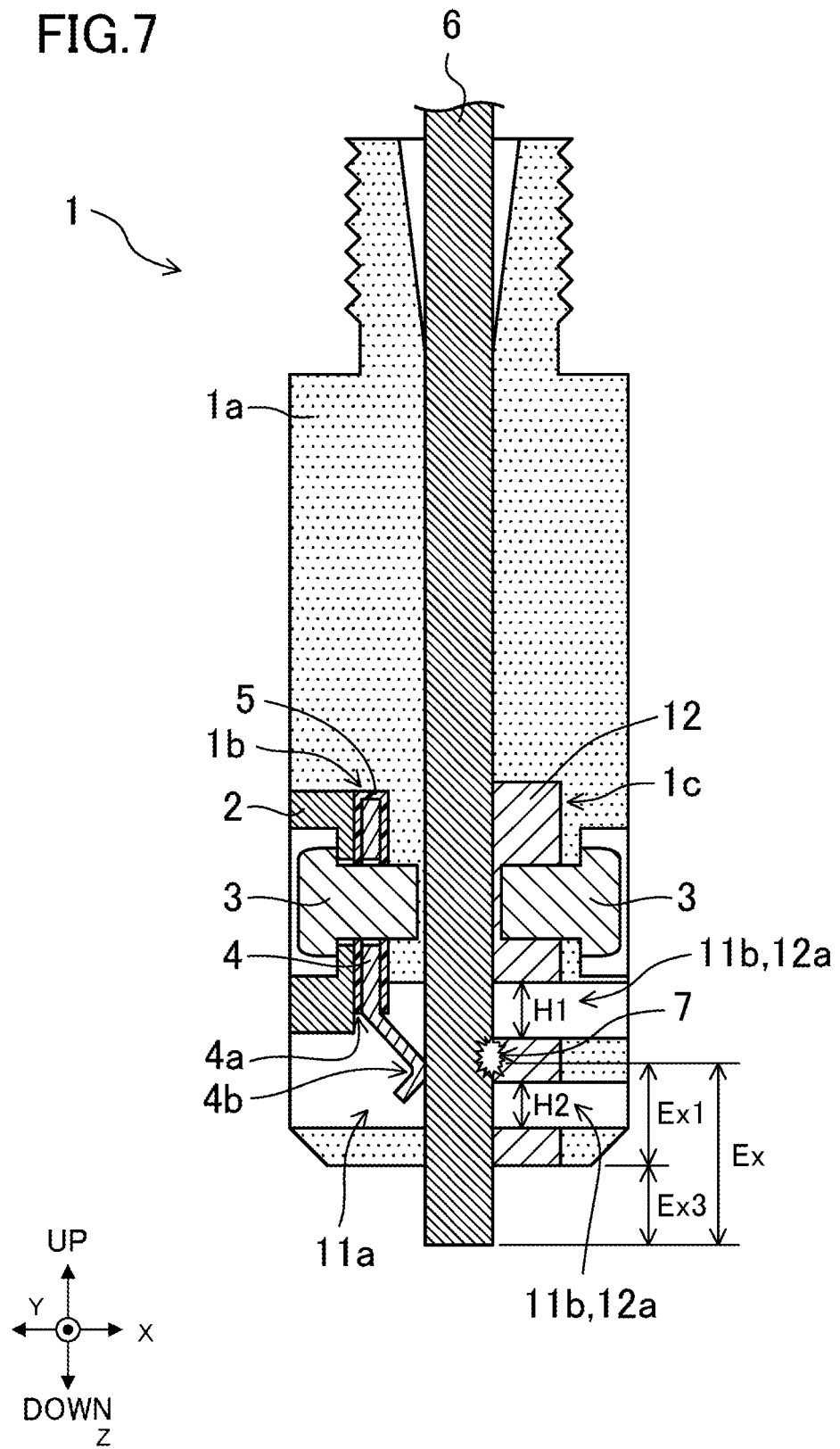
FIG. 7 is a schematic sectional view of a welding tip according to a fourth embodiment of the present invention.
Figure 8:
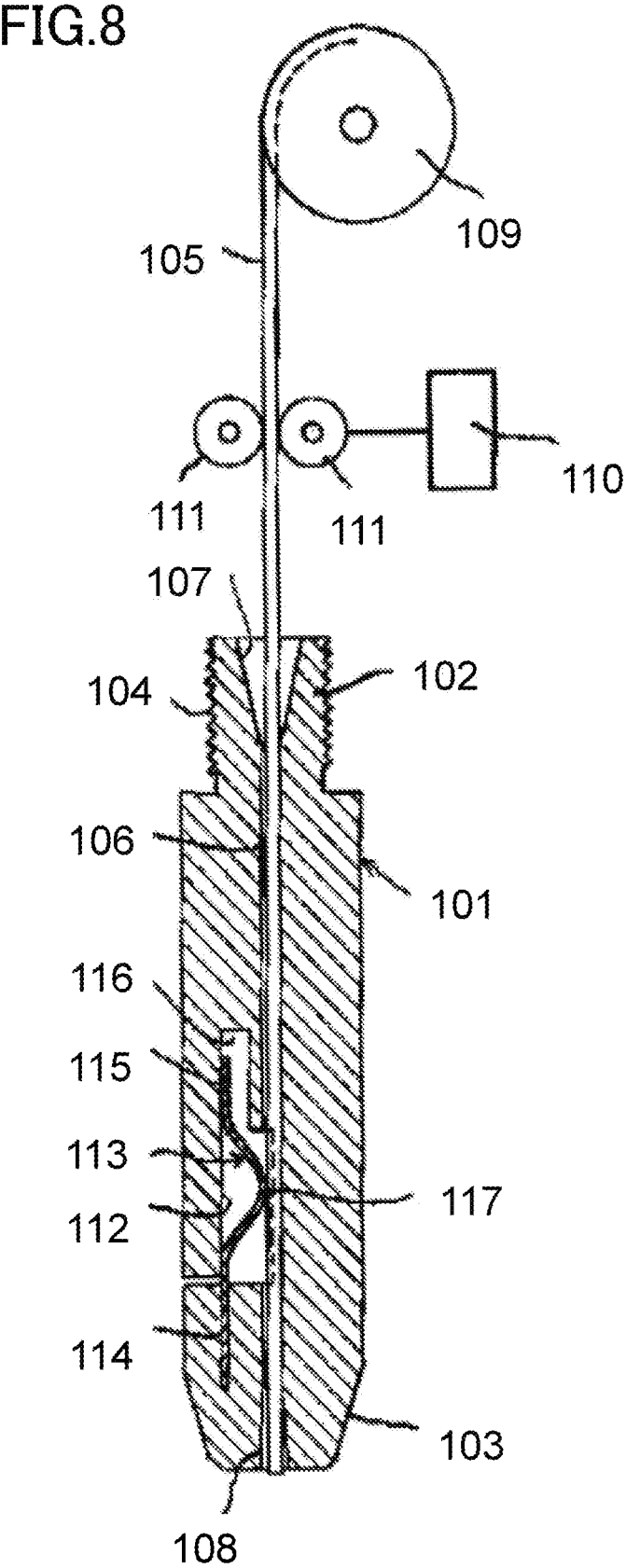
FIG. 8 is a schematic sectional view of a typical welding tip.

FIG. 7 is a schematic sectional view of a welding tip according to a fourth embodiment. The sectional view illustrated in FIG. 7 corresponds to the sectional view illustrated in FIG. 1C.

The configuration according to this embodiment differs from the structure according to the first embodiment in that a feeding member 12 that is a separate member from the tip body 1a is provided opposite to the leaf spring 4 relative to the welding wire 6, i.e., provided at the same side as the feeding point 7.

The feeding member 12 is a conductive member having a recess (not illustrated) extending in the Z direction along its inner surface. The feeding member 12 is releasably fitted in a notch portion 1c formed inside the tip body 1a and fastened to the tip body 1a by a metal bolt 3. The recess defines a part of the wire insertion bore 10, specifically, a part of the straight portion 10b. The feeding member 12 has apertures 12a in communication with the second apertures 11b. The apertures 12a are axially aligned at opposite relative both sides in axially with respect to the feeding point 7 with a certain distance therebetween.

As described in this embodiment, the feeding member 12 is a member separate from the tip body 1a and releasably mounted to the tip body 1a. A portion of the feeding member 12 in abutment with the welding wire 6 and pressed by the leaf spring 4 serves as the feeding point 7, through which current can be fed to the welding wire 6. In other words, since the feeding point 7 is provided on the feeding member 12, the tip body 1a is avoided from the wear. Furthermore, the feeding member 12 can be replaced easily, and this thus can extend the replacement interval of the tip body 1a. In this manner, the service life of the welding tip 1 can be increased. When the feeding member 12 is made of a wear-resistant material such as molybdenum or tungsten, the service life of the welding tip 1 can further be increased. Since the feeding member 12 is a small part, there will be no significant influence on manufacturing costs of the welding tip 1.

The feeding member 12 according to this embodiment can be applied to the configurations disclosed in the first to third embodiments including the first to third variations. In that case, the same advantages as those of this embodiment can be obtained. The configuration of the welding tip 1 is not limited to this, and each of the elements described in the embodiments may be combined, and defined as a new embodiment.

INDUSTRIAL APPLICABILITY

The welding tip according to the present invention can discharge wear particles created during welding to the outside and thus can have a longer service life. In this manner, the welding tip is particularly advantageous for use in an automatic welding system such as robot welding.

DESCRIPTION OF REFERENCE CHARACTERS

1 Welding Tip
1a Tip Body
2 Cover
3 Bolt
4 Leaf Spring (Pressing Part)
4a First Bent Portion
4b Second Bent Portion (Contact Point)

4c Aperture
4d Third Bent Portion
4e Abutment Portion (Contact Point) on welding wire 6
5 Insulator
6 Welding Wire
7 Feeding Point
8 Mount Portion
9 Thread
10 Wire Insertion Bore
11 Aperture
11a First Aperture
11b Second Aperture
12 Feeding Member
101 Contact Tip
102 Mount Portion
103 Welding End Portion
104 Thread
105 Welding Wire
106 Wire Insertion Bore
109 Wire Reel
110 Wire Feed Motor
111 Wire Feed Roller
112 Aperture
113 Leaf Spring
117 Center Protruding Portion

The invention claimed is:

1. A welding tip having a wire insertion bore along a central axis, the wire insertion bore having a feeding point on an inner circumferential surface to feed a current to a welding wire extending through the wire insertion bore and fed upward or downward, the welding tip comprising:
   a tip body having the wire insertion bore; and
   a pressing part configured to press the welding wire to abut on the feeding point,
   the tip body having a plurality of apertures in an outer circumferential surface of the tip body on a distal end side of the tip body,
   wherein the plurality of apertures includes
      a first aperture accommodating the pressing part, and
      a second aperture disposed in communication with the first aperture and configured to discharge wear particles created at the feeding point during welding to an outside of the tip body,
   wherein the pressing part has a first end that is a free end disposed on the distal end side of the tip body and a second end opposite to the first end and fixed to the tip body,
   wherein the pressing part is a leaf spring which extends from the second end toward a tip end of the tip body inside the first aperture, bends at a first bent portion so as to extend toward the welding wire, and bends at a second bent portion so as to extend away from the welding wire,
   wherein the second bent portion serves as a contact portion that presses the welding wire onto the feeding point with a certain pressing force, and
   wherein an insulator is provided between the second end and the tip body to electrically insulate the pressing part from the tip body.

2. The welding tip of claim 1, wherein
a distance between the feeding point and a distal end of the welding wire is determined to be increased with an increase in diameter of the welding wire, and the distance is capped at an upper limit to generate stable arc during welding.

3. The welding tip of claim 1, wherein
the insulator has a predetermined thermal resistance and is made of ceramic, a resin, or paper material.

4. The welding tip of claim 1, wherein
the pressing part has a contact point in abutment with the welding wire, the contact point having an angular shape or a flat shape.

5. The welding tip of claim 1, wherein
the pressing part abutting on the welding wire has a diameter which is equal to or larger than the diameter of the welding wire in a radial direction of the welding wire.

6. The welding tip of claim 1, further comprising
a feeding member that is a member separate from the tip body and releasably mounted to the tip body,
the feeding member having the feeding point.

7. The welding tip of claim 1, wherein the second aperture is one of a plurality of second apertures that are axially aligned and arranged on opposite sides of the feeding point with respect to an axial direction, and wherein the second apertures are spaced apart by a predetermined axial distance.

8. The welding tip of claim 1, wherein the second aperture is one of a plurality of second apertures that are aligned in a circumferential direction of the tip body and disposed on both sides of the feeding point with respect to the circumferential direction so as to open in a direction which crosses a pressing direction of the pressing part.

9. The welding tip of claim 1, wherein the second aperture is one of a plurality of second apertures that are aligned in a circumferential direction of the tip body and disposed on both sides of the feeding point with respect to the circumferential direction so as to open in a pressing direction of the pressing part.

* * * * *